(12) United States Patent
Makino et al.

(10) Patent No.: US 8,908,647 B2
(45) Date of Patent: Dec. 9, 2014

(54) MOBILE COMMUNICATION SYSTEM FOR REDUCING INTERFERENCE TO AN AREA

(75) Inventors: Satoshi Makino, Kawasaki (JP); Tomoatsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 12/839,789

(22) Filed: Jul. 20, 2010

(65) Prior Publication Data

US 2010/0284373 A1 Nov. 11, 2010

Related U.S. Application Data

(63) Continuation of application No. PCT/JP2008/050900, filed on Jan. 23, 2008.

(51) Int. Cl.
*H04W 36/30* (2009.01)

(52) U.S. Cl.
CPC .................................... *H04W 36/30* (2013.01)
USPC ........................................... 370/332; 455/436

(58) Field of Classification Search
CPC ... H04W 28/04; H04W 28/048; H04W 36/20; H04B 1/10–1/126
USPC ............................ 370/328–338; 455/436–444
See application file for complete search history.

(56) References Cited

U.S. PATENT DOCUMENTS

| | | | |
|---|---|---|---|
| 6,301,478 B1 | 10/2001 | Wallstedt et al. | |
| 2002/0168991 A1* | 11/2002 | Kochanski et al. | 455/505 |
| 2006/0014538 A1 | 1/2006 | Yuan | |
| 2006/0084445 A1 | 4/2006 | Minami et al. | |
| 2006/0121901 A1 | 6/2006 | Tanaka et al. | |
| 2007/0238480 A1* | 10/2007 | Lin et al. | 455/522 |
| 2009/0207811 A1* | 8/2009 | Zhu et al. | 370/332 |
| 2009/0252122 A1* | 10/2009 | Leinonen et al. | 370/332 |

FOREIGN PATENT DOCUMENTS

| | | |
|---|---|---|
| JP | 2000295650 | 10/2000 |
| JP | 2002209253 | 7/2002 |
| JP | 2002247630 | 8/2002 |
| JP | 2003259414 | 9/2003 |
| JP | 2005244906 | 9/2005 |
| JP | 2006115291 | 4/2006 |
| WO | 2005025253 A1 | 3/2005 |

OTHER PUBLICATIONS

Notice of Reason for Rejection Japanese Office Action dated Jul. 3, 2012 received in corresponding Application No. 2009-550398.
International Search Report dated Apr. 1, 2008 in corresponding International application No. PCT/JP2008/050900.
Notification of Transmittal of Translation of the International Preliminary Report on Patentability dated Sep. 10, 2010 received in International application No. PCT/JP2008/050900.
Extended European Search Report dated Oct. 4, 2013 issued in corresponding European patent Application No. 08703730.5.

* cited by examiner

*Primary Examiner* — Pao Sinkantarakorn

(74) *Attorney, Agent, or Firm* — Smith, Gambrell & Russell, LLP

(57) ABSTRACT

A mobile communication system has a plurality of communication areas being connection destinations of a mobile terminal. When a radio wave transmitted from a communication area to the mobile terminal connected to the communication area becomes an interference wave in another communication area different from the communication area, a handover target where an interference quantity may be reduced by handover is determined from at least one handover target candidates with respect to the communication area, and the mobile terminal executes forcible handover to the handover target.

11 Claims, 22 Drawing Sheets

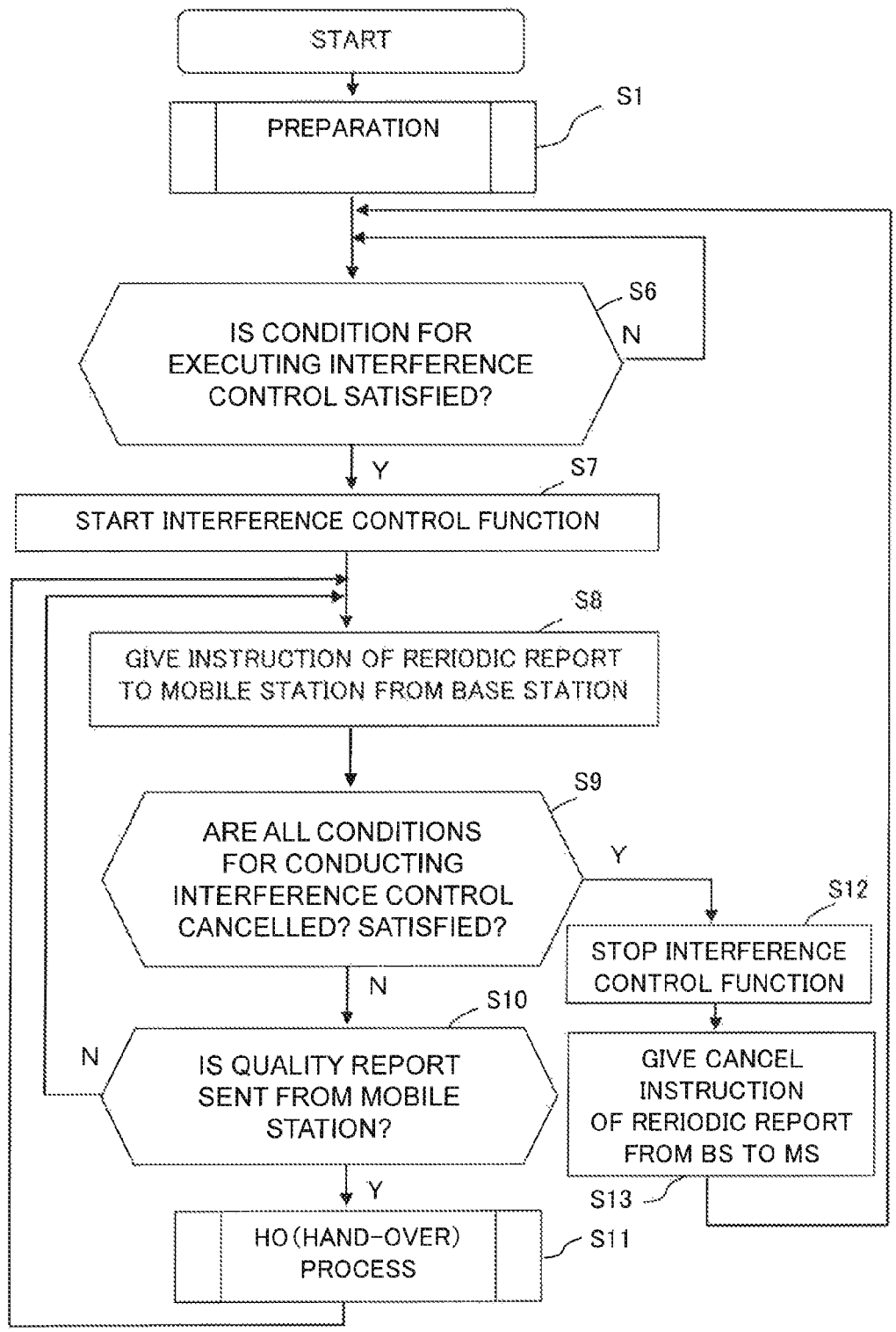

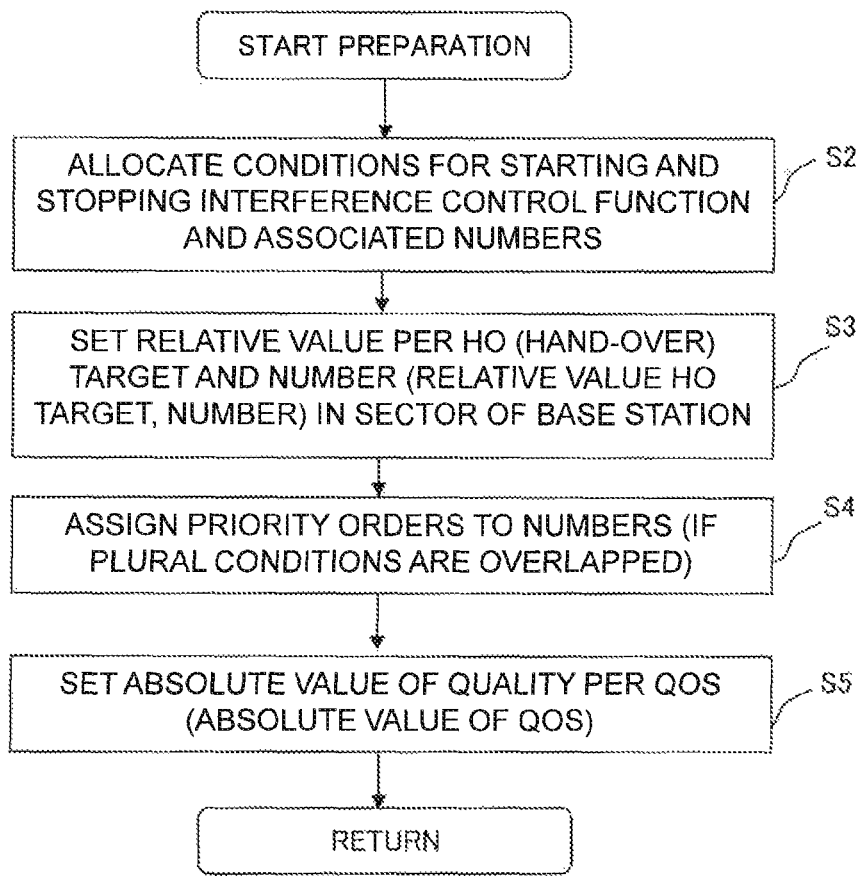

FIG. 7

| CONDITION | | | NUMBER TO BE ADOPTED (REFERENCE NUMBER) |
|---|---|---|---|
| BASE STATION ID | STARTING CONDITION AND THRESHOLD VALUE | STOPPING CONDITION AND THRESHOLD VALUE | |
| 21 (SECTOR C OF STATION F) | TIME ZONE: AM10:00 – PM6:00 OR AVERAGE TRANSMISSION POWER (RELATIVE VALUE) ≥ 80% | AVERAGE TRANSMISSION POWER (RELATIVE VALUE) ≤50% | NUMBER 1 |
| 42 (SECTOR B OF STATION T) | TIME ZONE: PM6:00 – AM2:00 OR AVERAGE TRANSMISSION POWER (RELATIVE VALUE) ≥ 80% | TIME ZONE: AM3:00 – PM5:00 OR AVERAGE TRANSMISSION POWER (RELATIVE VALUE) ≤ 50% | NUMBER 2 |

FIG. 8

BASE STATION ID: 20 (SECTOR B OF STATION-XXX)

| BASE STATION ID OF HANDOVER TARGET | RELATIVE VALUE OF QUALITY (dB) | | | |
|---|---|---|---|---|
| | NUMBER 1 | NUMBER 2 | NUMBER 3 | NUMBER 4 |
| 19 (SECTOR A OF STATION-XXX) | 0dB | 1.0dB | 0dB | 1.5dB |
| 21 (SECTOR C OF STATION -XXX) | 1.5dB | 1.0dB | 0dB | 0dB |
| 35 (SECTOR A OF STATION -YYY) | -1.5dB | 0dB | -0.5dB | -1.0dB |
| 42 (SECTOR B OF STATION -ZZZ) | 0dB | 0dB | 0dB | 0dB |

FIG. 9

| PRIORITY LEVEL | REFERENCE NUMBER |
|---|---|
| 1 | NUMBER 1 |
| 2 | NUMBER 2 |
| 3 | NUMBER 3 |
| 4 | NUMBER4 |

FIG. 10

| QoS | ABSOLUTE VALUE (CALCULATED VALUE OF QUALITY AFTER CONDUCTING HAND-OVER) |
|---|---|
| QoS-1 (e.g. Best Effort) | 1.0dB |
| QoS-2 (e.g. Non Real Time Polling Service) | 2.0dB |
| QoS-3 (e.g. Real Time Polling Service) | 3.5dB |
| QoS-4 (e.g. OTHER THAN QoS1, 2, 3 ) | 1.0dB |

FIG. 14A

BS-31 SECTOR A

| HO TARGET | RELATIVE VALUE |
|---|---|
| BS-31, SECTOR-B | 0[dB] |
| BS-31, SECTOR-C | -0.2[dB] |
| BS-32, SECTOR-A | 0[dB] |

FIG. 14B

BS-31 SECTOR B

| HO TARGET | RELATIVE VALUE |
|---|---|
| BS-31, SECTOR-A | 0[dB] |
| BS-31, SECTOR-C | -0.2[dB] |
| BS-32, SECTOR-B | 0[dB] |

FIG. 14C

BS-31 SECTOR C

| HO TARGET | RELATIVE VALUE |
|---|---|
| BT-31, SECTOR-A | 2.0[dB] |
| BS-31, SECTOR-B | 2.0[dB] |
| BS-32, SECTOR-A | 1.5[dB] |
| BS-32, SECTOR-B | 1.5[dB] |
| BS-32, SECTOR-C | -1.0[dB] |

FIG. 15A

BS-32 SECTOR A

| HO TARGET | RELATIVE VALUE |
|---|---|
| BS-31, SECTOR-A | 0[dB] |
| BS-31, SECTOR-C | -1.5[dB] |
| BS-32, SECTOR-B | 0[dB] |
| BS-32, SECTOR-C | -2.0[dB] |

FIG. 15B

BS-32 SECTOR B

| HO TARGET | RELATIVE VALUE |
|---|---|
| BS-32, SECTOR-A | 0[dB] |
| BS-32, SECTOR-C | -2.0[dB] |
| BS-31, SECTOR-C | -1.5[dB] |

FIG. 15C

BS-32 SECTOR C

| HO TARGET | RELATIVE VALUE |
|---|---|
| BS-31, SECTOR-C | 1.0[dB] |
| BS-32, SECTOR-A | 2.0[dB] |
| BS-32, SECTOR-B | 2.0[dB] |

FIG. 16

| QoS | ABSOLUTE VALUE for QoS (CALCULATED VALUE OF QUALITY AFTER CONDUCTING HO) |
|---|---|
| QoS-1 (e.g. BEST EFFORT) | 1.0[dB] |
| QoS-2 (e.g. NON REAL TIME POLLING SERVICE) | 2.0[dB] |
| QoS-3 (e.g. REAL TIME POLLING SERVICE) | 3.5[dB] |
| QoS-4 (e.g. EXCEPT QoS-1, QoS-2 AND QoS-3) | 1.0[dB] |

FIG. 18

| CONDITION | | | NUMBER TO BE ADOPTED (REFERENCE NUMBER) |
|---|---|---|---|
| BASE STATION ID | STARTING CONDITION AND THRESHOLD VALUE | STOPPING CONDITION AND THRESHOLD VALUE | |
| BS-31, SECTOR C | TIME ZONE: AM10:00 – PM6:00 OR AVERAGE TRANSMISSION POWER (RELATIVE VALUE) ≥ 80% | AVERAGE TRANSMISSION POWER (RELATIVE VALUE) ≤ 50% | NUMBER 1 |
| BS-32, SECTOR A | TIME ZONE: PM6:00 – AM2:00 OR AVERAGE TRANSMISSION POWER (RELATIVE VALUE) ≥ 80% | TIME ZONE: AM3:00 – PM5:00 OR AVERAGE TRANSMISSION POWER (RELATIVE VALUE) ≥ 50% | NUMBER 2 |

FIG. 19

| PRIORITY LEVEL | CORRESPONDING NUMBER |
|---|---|
| 1 | NUMBER 1 |
| 2 | NUMBER 2 |

FIG. 20A

BS-31, SECTOR A

| HO TARGET | REFERENCE NUMBER 1 | REFERENCE NUMBER 2 |
|---|---|---|
| BS-31, SECTOR-B | 0dB | 1.0dB |
| BS-31, SECTOR-C | -2.0dB | 0dB |
| BS-32, SECTOR-A | 0dB | 0dB |

FIG. 20B

BS-31, SECTOR B

| HO TARGET | REFERENCE NUMBER 1 | REFERENCE NUMBER 2 |
|---|---|---|
| BS-31, SECTOR-A | 0dB | -1.0dB |
| BS-31, SECTOR-C | -2.0dB | 0dB |
| BS-32, SECTOR-B | 0dB | 0dB |

FIG. 20C

BS-31, SECTOR C

| HO TARGET | REFERENCE NUMBER 1 | REFERENCE NUMBER 2 |
|---|---|---|
| BS-31, SECTOR-A | 2.0dB | 0dB |
| BS-31, SECTOR-B | 2.0dB | 0dB |
| BS-32, SECTOR-A | 1.5dB | -0.5dB |
| BS-32 SECTOR-B | 1.5dB | 0dB |
| BS-32, SECTOR-C | -1.0dB | 0dB |

FIG. 21A

BS-32, SECTOR A

| HO TARGET | REFERENCE NUMBER 1 | REFERENCE NUMBER 2 |
|---|---|---|
| BS-31, SECTOR-A | 0dB | 0dB |
| BS-31, SECTOR-C | -1.5dB | 0.5dB |
| BS-32, SECTOR-B | 0dB | 1.0dB |
| BS-32, SECTOR-C | -2.0dB | 0dB |

FIG. 21B

BS-32, SECTOR B

| HO TARGET | REFERENCE NUMBER 1 | REFERENCE NUMBER 2 |
|---|---|---|
| BS-32, SECTOR-A | 0dB | -1.0dB |
| BS-32, SECTOR-C | -2.0dB | 0dB |
| BS-31, SECTOR-C | -1.5dB | 0dB |

FIG. 21C

BS-32, SECTOR C

| HO TARGET | REFERENCE NUMBER 1 | REFERENCE NUMBER 2 |
|---|---|---|
| BS-31, SECTOR-C | 1.0dB | 0dB |
| BS-32, SECTOR-A | 2.0dB | 0dB |
| BS-32, SECTOR-B | 2.0dB | 0dB |

FIG. 22

| QoS | ABSOLUTE VALUE OF QoS (CALCULATED VALUE OF QUALITY AFTER CONDUCTING HAND-OVER) |
|---|---|
| QoS-1 (e.g. Best Effort) | 3.0dB |
| QoS-2 (e.g. Non Real Time Polling Service) | 3.5dB |
| QoS-3 (e.g. Real Time Polling Service) | 6.0dB |
| QoS-4 (e.g. OTHER THAN QoS1, 2, 3 ) | 3.0dB |

MOBILE COMMUNICATION SYSTEM FOR REDUCING INTERFERENCE TO AN AREA

CROSS-REFERENCE TO RELATED APPLICATION

This is a continuation of Application PCT/JP2008/050900, filed on Jan. 23, 2008, now pending, the entire contents of which are incorporated herein by reference.

FIELD

The present invention relates to a mobile communication system which performs communications by use of radio transmission.

BACKGROUND

In the mobile communication system, a quality of a wireless line in a downlink (base station→mobile station) largely depends on a thermal noise and interference waves. Hence, there arises a big problem of how the interference waves are restrained.

The related arts involve restraining the interference waves exerted on a certain focused area and therefore manually adjusting a down tilt of an antenna and a physical direction of a sector antenna or controlling transmission power.

FIGS. 1A and 1B illustrate a pre-adaptation example and a post-adaptation example of the down tilt of the sector antenna. As illustrated in FIG. 1A, it is assumed that radio beams from a sector antenna c of a base station 5A exert the large interference with a certain focused area AR1. In this case, as illustrated in FIG. 1B, the down tilt of the sector antenna c is adjusted so that the radio beams from the sector antenna c do not reach the focused area AR1. With this adjustment, the interference may be restrained.

FIGS. 2A and 2B illustrate a pre-adaptation example and a post-adaptation example of the directional adjustments of the sector antennae. As illustrated in FIG. 2A, before adjusting the directions of the sector antennae, it is assumed that the radio beams from a sector antenna a (direction of 90°) reach the focused area AR1 to thereby exert the large influence of the interference on the focused area AR1. In this case, as illustrated in FIG. 2B, the antenna directions of the sector antennae a and b are adjusted so that the radio beams from the sector antennae a and b do not reach the focused area AR1. This adjustment enables the interference to be restrained.

FIGS. 3A and 3B illustrate a pre-adaptation example and a post-adaptation example of transmission power control. As illustrated in FIG. 3A, in the case of transmitting the radio waves with high-output transmission power toward each of the mobile stations 1A, 1B and 1C from the sector antenna c of the base station 5A, an assumption is that the interference largely affects the focused area AR1. In this case, as illustrated in FIG. 3B, the transmission power from the sector antenna c is controlled, in which the transmission power control is executed so that the radio waves are transmitted with the higher transmission power as the mobile station is distanced farther from the base station 5A. With this contrivance, the interference with the focused area AR1 can be restrained.

Patent document 1: Japanese Laid-Open Patent Publication No. 2006-115291
Patent document 2: Japanese Laid-Open Patent Publication No. 2000-295650
Patent document 3: International Publication No. WO2005/025253

The technique illustrated in FIGS. 1A and 1B involves increasing the number of mobile terminals deviating from the wireless area due to the narrowed wireless area formed (covered) by the base station.

Further, the technique illustrated in FIGS. 2A and 2B is disabled, if a zone, from which is wished to avoid the interference, exists in the sector direction of 30 degrees in the state of FIG. 2B, from reducing the interference with this zone.

Moreover, the technique illustrated in FIGS. 3A and 3B, since a level of a signal addressed to the mobile station 1C in FIG. 3B is comparatively high due to a far position of the mobile station 1C, may not restrain the occurrence of the interference caused therefrom.

SUMMARY

Aspects of the present invention adopts the following means in order to solve the problems described above.

One of aspects of the present invention involves a communication control method by which a mobile terminal located in an overlapped area between a first wireless area formable in a first sector direction of a first base station which forms a plurality of sectors and a second wireless area formable in a second sector direction of a second base station which forms a plurality of sectors can perform better wireless communications by performing the wireless communications with the first base station than by performing the wireless communications with the second base station, the method including: controlling the mobile terminal to perform the wireless communications with the second base station in the second wireless area formable in the second sector direction when the first sector direction faces wider a specified area than the second sector direction.

It should be noted that the other aspects of the present invention is established may include, without being limited to the mobile communication system described above, by way of the invention of an interference control method in the mobile communication system or the invention of a base station (or a base station apparatus) in the mobile communication system.

In the aspects of the present invention, the "base station" is may be used as a unit for managing one communication area. Hence, portions (components) related to the respective sectors in the single base station (or abase station apparatus) having a plurality of sector antennae may be included in the "base station" according to the aspects of the present invention. As a matter of course, the base station having the single cell as the communication area may be included in the "base station" according to the present invention.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6A illustrates an example of a flow for realizing the interference control method according to the embodiment of the present invention.

FIG. 6B illustrates an example of the flow for realizing the interference control method according to the embodiment of the present invention.

FIG. 7 illustrates an example of settings in a condition table containing a starting condition and a stopping condition of the interference control.

FIG. 8 illustrates an example of settings in a relative value table.

FIG. 9 illustrates an example of settings in a priority level table.

FIG. 10 illustrates an example of settings in an absolute value table (quality absolute value per QoS).

FIG. 14A illustrates the relative value table with respect to the sector of the base station in the first specific example.

FIG. 14B illustrates the relative value table with respect to the sector of the base station in the first specific example.

FIG. 14C illustrates the relative value table with respect to the sector of the base station in the first specific example.

FIG. 15A illustrates the relative value table with respect to the sector of the base station in the first specific example.

FIG. 15B illustrates the relative value table with respect to the sector of the base station in the first specific example.

FIG. 15C illustrates the relative value table with respect to the sector of the base station in the first specific example.

FIG. 16 illustrates the absolute value table in the first specific example.

FIG. 18 illustrates a condition table in the second specific example.

FIG. 19 illustrates a priority level table in the second specific example.

FIG. 20A illustrates the relative value table with respect to the sector of the base station in the second specific example.

FIG. 20B illustrates the relative value table with respect to the sector of the base station in the second specific example.

FIG. 20C illustrates the relative value table with respect to the sector of the base station in the second specific example.

FIG. 21A illustrates the relative value table with respect to the sector of the base station in the second specific example.

FIG. 21B illustrates the relative value table with respect to the sector of the base station in the second specific example.

FIG. 21C illustrates the relative value table with respect to the sector of the base station in the second specific example.

FIG. 22 illustrates the absolute value table in the second specific example.

DESCRIPTION OF THE EMBODIMENT

An embodiment of the present invention will hereinafter be described with reference to the drawings. A configuration in the embodiment is an exemplification, and the present invention is not limited to the configuration in the embodiment.

A mobile communication system according to the embodiment has a hard handover function, in which a base station or a base station control apparatus (base station controller) (which can simply become a high-order device above the base station) forcibly hands over a mobile station kept in connection with a certain sector (cell) of a certain base station to one other base station or one other sector within the same base station in a way that takes into consideration a direction in which to cause interference when a certain specified condition is satisfied. With this hard handover function, an interference quantity of a downlink in a specified direction (example: town side, interference area, important area) is reduced to the greatest possible degree, but instead the interference quantity of the downlink in another direction (example: mountain side, low interference area, a low-importance-degree area) is forced to be sacrificed, thereby enabling the interference quantity of the whole area to be properly dispersed. It is therefore feasible to restrain the interference in a certain focused area.

In another aspect, in a case where the mobile terminal located in an overlapped area of a first wireless area formable in a direction of a first sector of a first base station which forms (covers) a plurality of sectors with a second wireless area formable in a direction of a second sector of a second base station which forms (covers) a plurality of sectors, can perform more preferable wireless communications with the first base station than performing the wireless communications with the second base station, a communication control method involves controlling the mobile terminal to perform the wireless communications with the second base station in the second wireless area formable in the second sector direction if having a wider region faced toward a specified area in the first sector direction than in the second sector direction.

Figure 1A:
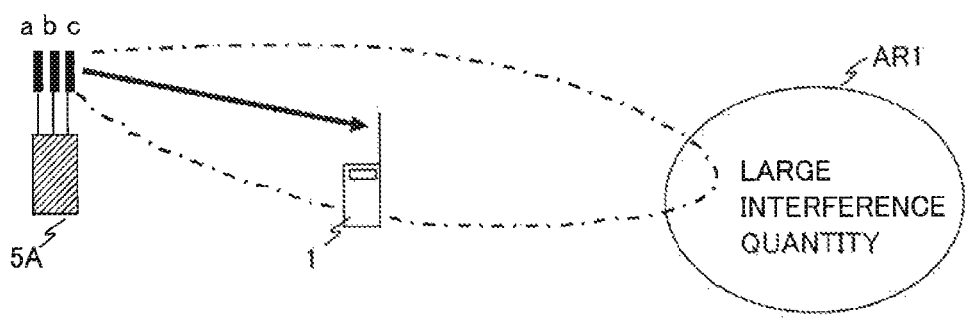
FIG. 1A illustrates an example (pre-adaptation: pre-adjustment of tilt) of restraining interference by adjusting a down tilt.
Figure 1B:
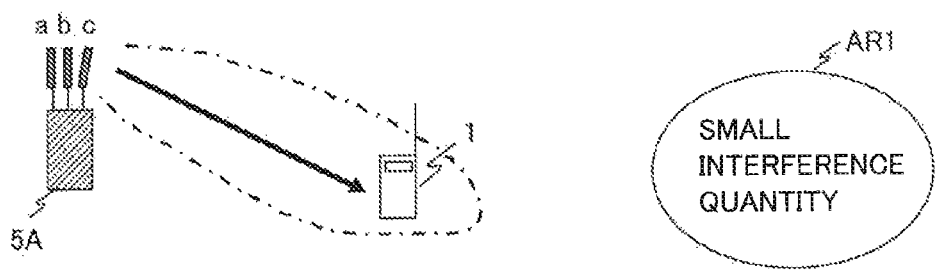
FIG. 1B illustrates an example (post-adaptation: post-adjustment of tilt) of restraining the interference by adjusting the down tilt.
Figure 2A:
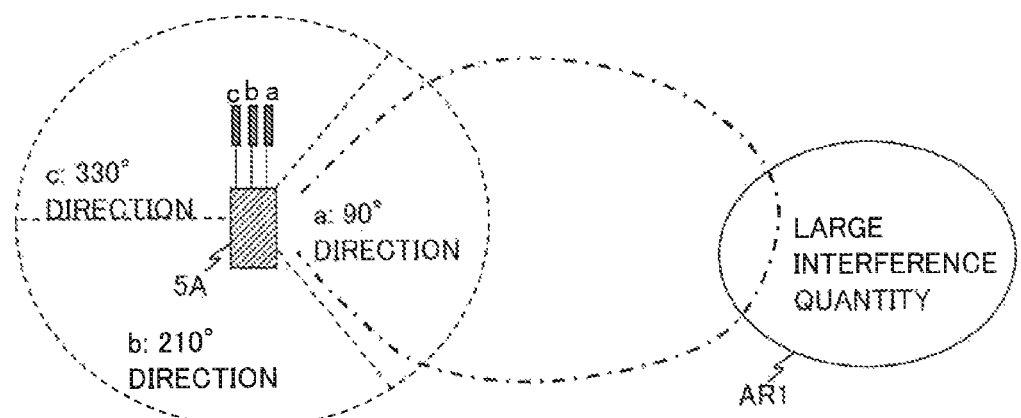
FIG. 2A illustrates an example (pre-adaptation: pre-adjustment of direction) of restraining the interference by adjusting an antenna direction.
Figure 2B:
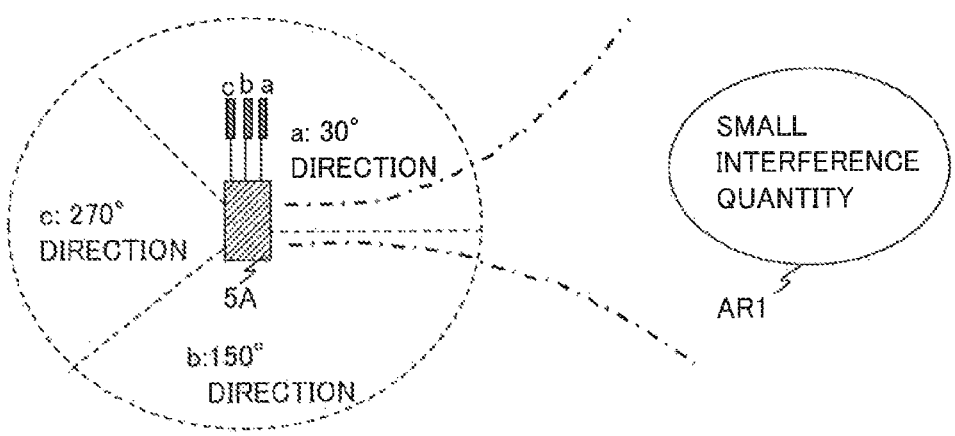
FIG. 2B illustrates an example (post-adaptation: post-adjustment of direction) of restraining the interference by adjusting the antenna direction.
Figure 3A:
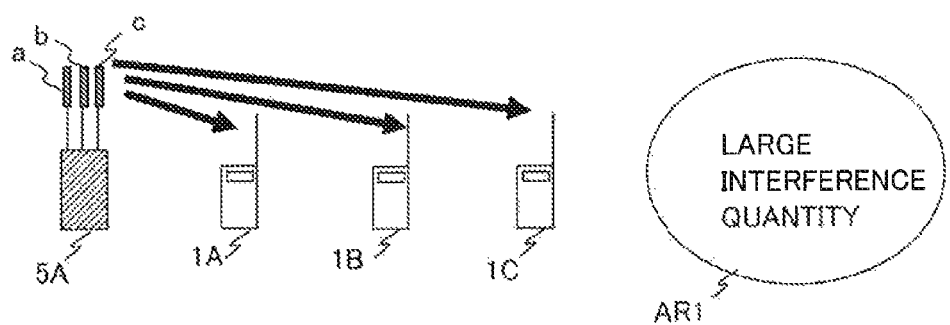
FIG. 3A illustrates an example (pre-adaptation: power control is not done) of restraining the interference by controlling transmission power.
Figure 3B:
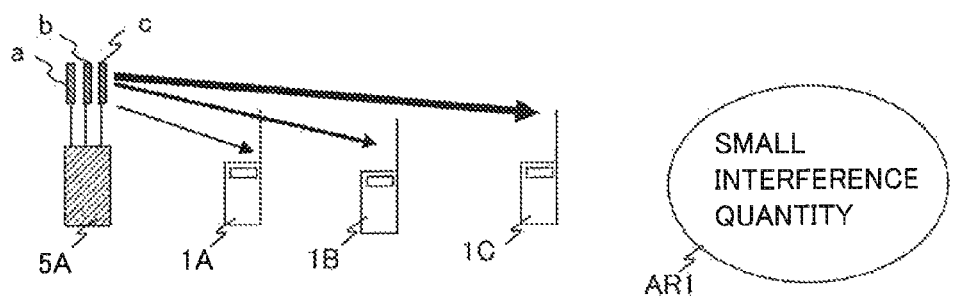
FIG. 3B illustrates an example (post-adaptation: power control is done) of restraining the interference by controlling transmission power.
Figure 4:
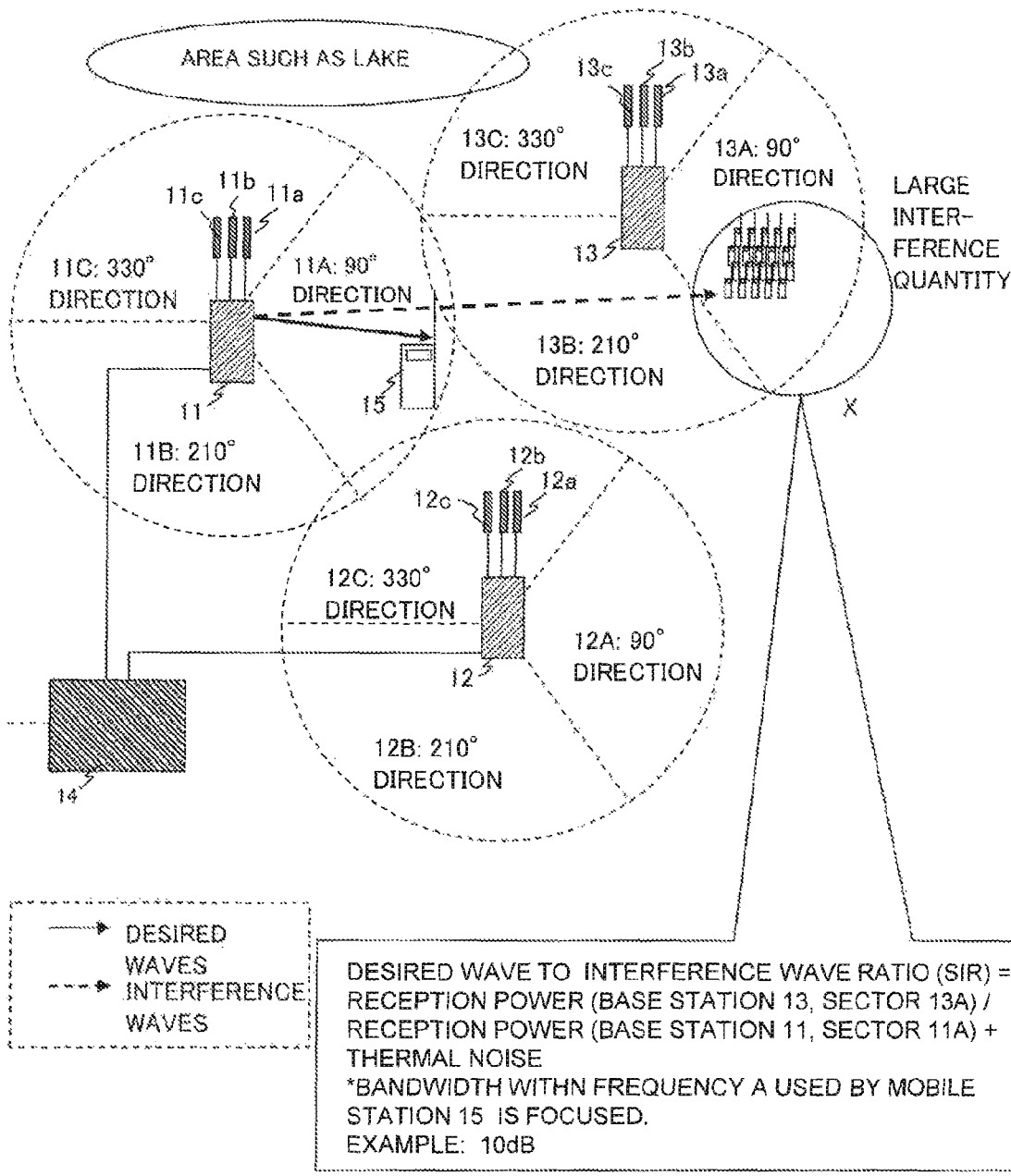
FIG. 4 illustrates an example of a mobile communication system to which an embodiment of the present invention can be applied.
Figure 5:
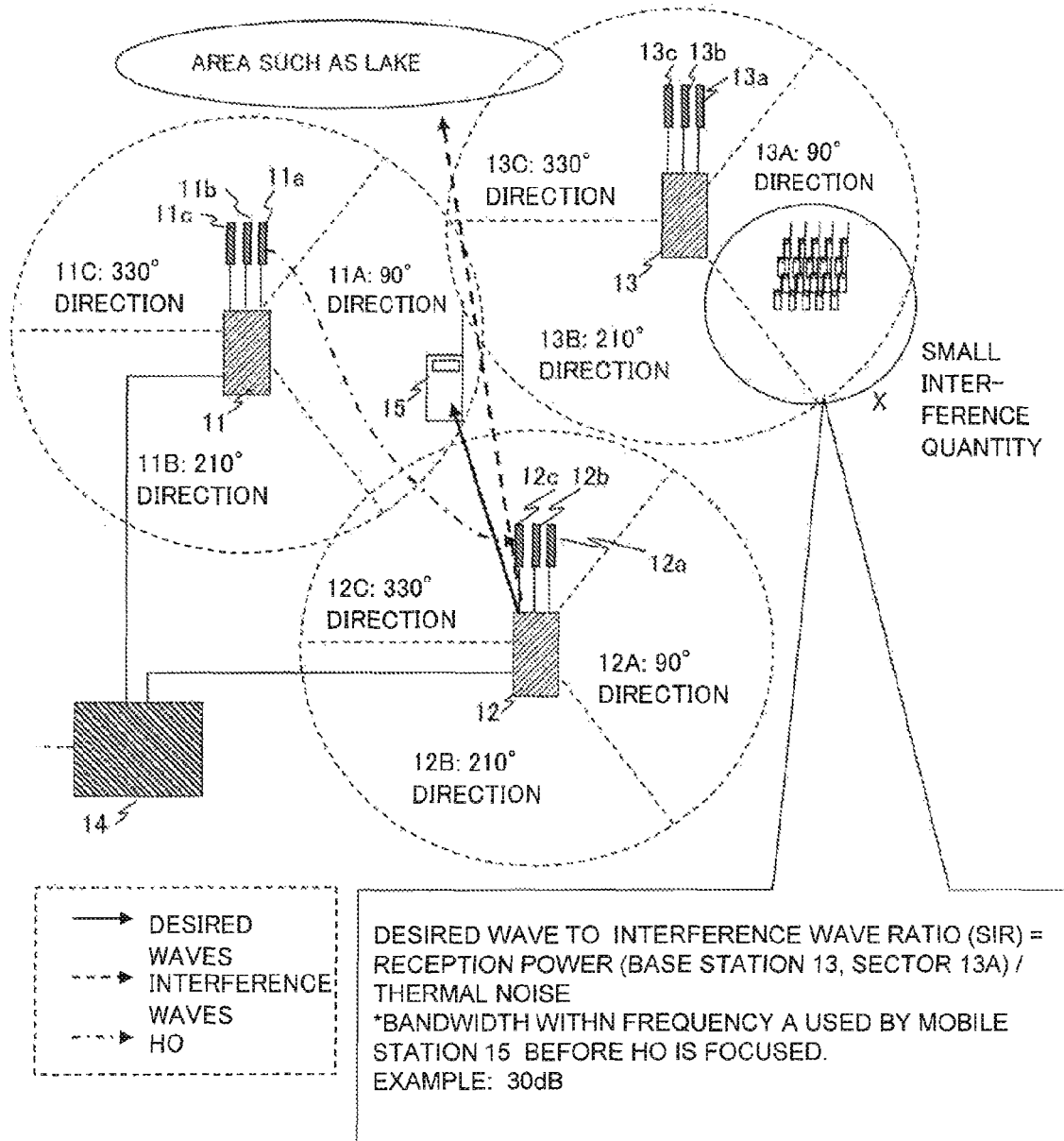
FIG. 5 illustrates how an interference control method according to the embodiment of the present invention is applied to the mobile communication system illustrated in FIG. 4.

FIG. 4 illustrates a communication environment of the mobile communication system to which the embodiment of the present invention can be applied, and FIG. 5 illustrates a case in which an interference control function (interference restraining function) according to the embodiment of the present invention is implemented in the mobile communication system illustrated in FIG. 4.

In FIG. 4, the mobile communication system includes a plurality of base stations (three base stations are prepared in FIG. 4) 11, 12, 13 and a base station controller (the high-order device above the base stations) 14 to which the respective base stations 11, 12, 13 are connected.

Each of the base stations 11, 12, 13 is equipped with three pieces of sector antennas by which a communication area of each base station is segmented into three sectors. An example illustrated in FIG. 4 is that a direction (angle) covered by each sector antenna is set in the same direction among the base stations. An angle range covered by the sector antenna of each base station can be arbitrarily determined.

In FIG. 4, the communication areas of the base stations 11, 12, 13 are adjacent to each other. A case assumed herein is that a mobile station 15 residing in a sector (sector 11A) covered by the sector antenna 11a connects with the sector 11A, and radio waves are radiated toward the mobile station 15 from the sector antenna 11a. Note that the sector direction is defined as a direction in which to spread the radio waves radiated from the antenna of the base station.

The radio waves radiated from the sector antenna 11a become desired radio waves (which are defined as reception target radio waves) for the mobile station 15. By contrast, the radio waves transmitted from the sector antenna 11a may turn out to be interference waves with a sector (sector 13A) covered by the sector antenna 13a of the base station 13 neighboring to the base station 11. This is because the sector direction embraces the wireless area formed by the sector 13A.

Thus, in the example illustrated in FIG. 4, the in-connection mobile station 15, which is being connected with the sector 11A of the base station 11 exists, resulting in an increase in interference quantity in a focused area (the sector 13A of the base station 13: symbol "X"). Especially, the sector 13A of the base station 13 is in a state of being largely affected by the interference waves due to the connections of a number of mobile stations (e.g., twenty (20) mobile stations) to the sector 13A. As a matter of course, irrespective of the number of the mobile stations, an area with the interference desired to be avoided might exist in the sector 13A.

Such being the case, as illustrated in FIG. 5, the interference control according to the embodiment of the present invention is executed. To be specific, the connection of the mobile station 15 with the sector 11A of the base station 11 is switched over (initial connection, handover) to the sector 12C of the base station 12. In this case, the mobile station 15 may receive the desired radio waves from the sector antenna 12c of the base station 12. On the other hand, the interference waves radiated outwardly of the sector 12C from the sector antenna 12c are transmitted toward an area, exhibiting a low degree of importance, such as a lake existing outside the communication area of the base station 11. Namely, the direction of the sector 12C does not include a large proportion of the wireless area of the sector 13A with which the interference is desired to be avoided (a rate of including the wireless area of the sector 13A is smaller than in the direction of the sector 11A).

With this scheme, the interference quantity with respect to the focused area (specified area: sector 13A) may be reduced. At this time, it is feasible to select a connecting destination (handover destination (HO target)) capable of restraining low the influence of the interference waves, which is exerted on the ambient areas (sectors).

On this occasion, the radio signals may be also transmitted to the mobile station 15 by raising transmission power so that the wireless area formed in the direction of the sector 12C spreads.

Incidentally, the handover control is exemplified such that the base station 11 is, for example, made to report qualities of reception signals received by the mobile station 15 from the base stations 11, 12 (the mobile station 15 is assumed to wirelessly connect with the base station 11), and, though the signal received from the sector 11A of the base station 11 has a higher quality of reception than the signal received from the sector 12C of the base station 12 has, when determining that the sector 12C of the base station 12 is in a wireless communication enabled state, it is also possible to transmit a control signal used for the base station 11 to give an instruction that the connection of the mobile station 15 is handed over to the sector 12C of the base station 12.

For instance, as in the sectors 11B, 11C, a scheme is to relax a standard (e.g., wireless quality Q1-ΔQ with in-communication base station<wireless quality Q2 with handover target base station) applied when executing the handover to the sector 12C from the sector 11A in comparison with a standard (e.g., wireless quality Q1 with in-communication base station<wireless quality Q2 with handover target base station) applied if the sector direction does not include the area (e.g., sector 13A) with which the interference is desired to be avoided.

Note that on the occasion of controlling not the handover but the initial connection target, the base stations 11, 12 may simply notify the mobile station 15 through a piece of broadcast information that a more relaxed condition is to stand by in the sector 12C with respect to the sector 11A.

Operational effects in the case of adopting a WiMAX (Worldwide Interoperability for Microwave Access) system as the wireless communication system, will be described in the examples illustrated in FIGS. 4 and 5. Herein, an assumption is that according to frequency planning, a frequency A is allocated to the sector 11A of the base station 11, a frequency B is allocated to the sector 11B, and a frequency C is allocated to the sector 11C. With respect to the base stations 12, 13, similarly it is assumed that the frequency A is allocated to the sectors 12A and 13A, the frequency B is allocated to the sectors 12B and 13B, and the frequency C is allocated to the sectors 12C and 13C.

Now, it is assumed that the plurality of in-connection mobile stations (e.g., the twenty mobile stations) exists in the sector 13A of the base station 13 as the focused area. At this time, in the state illustrated in FIG. 4, the radio waves for the mobile station 15 are transmitted at all times to the sector 11A of the base station 11 from the sector antenna 11a. Large interference is therefore caused in the focused area (sector 13A).

In this state, within the focused area (sector 13A), a desired wave to interference wave power ratio (Signal-to-Interference power Ratio: SIR) in a bandwidth within the frequency A used by the mobile station 15 is given in the following formula (1).

$$\text{SIR} = \text{Reception Power(Sector 13A of Base Station 13)} / \text{Reception Power(Sector 11A of Base Station 11)} + \text{Thermal Noise} \quad (1)$$

For example, after taking a propagation loss and the antenna direction into consideration, the assumption is that there is a difference between reception power levels from the respective base stations is on the order of 10 [dB], the reception power is high, and the thermal noise is sufficiently ignorable. In this case, the SIR in the bandwidth within the frequency A used by the mobile station 15 becomes 10 [dB].

In regard to this point, as illustrated in FIG. 5, the hard handover is executed, which forcibly switches over the connection target of the mobile station 15 to the sector 12C of the base station 12 from the sector 11A of the base station 11. Then, the interference exerted on the focused area (sector 13A), which is caused by the existence of the mobile station 15, disappears (because of the difference of frequency between the sector 13A and the sector 12C).

At this time, within the focused area (sector 13A), the desired wave to interference wave power ratio (SIR) in the bandwidth within the frequency A used by the mobile station 15 is given in the following formula (2).

$$SIR = \text{Reception Power(Sector 13A of Base Station 13)/Thermal Noise} \quad (2)$$

For instance, if a difference between the reception power of the desired radio waves and the thermal noise is on the order of 30 [dB], the SIR (containing the thermal noise) in the bandwidth within the frequency A used by the mobile station 15 becomes 30 [dB] as it is.

Accordingly, the SIR in the bandwidth within the frequency A used by the mobile station 15 before the handover within the focused area (sector 13A) is improved up to 20 [dB] as compared with before conducting the interference retraining control. As a result, a multiplicity of mobile stations existing in the focused area (sector 13A) enjoys a chance of ensuring a high communication quality (QoS: Quality of Service) such as acquiring a high throughput.

It follows from what has discussed above that if the interference control is effectively executed, as there is a larger deviation (variance) especially in communication environments such as a traffic distribution, a subscriber distribution and an important area distribution, the degree of improvement becomes much higher.

It is to be noted that the mobile station 15 undergoing forcibly the hard handover can be configured so as not to be largely affected such as a decline of quality (or so as to allow a sacrifice to some extent) if a desired radio wave reception power (Received Signal Code Power: RSCP) or the SIR required to the minimum for receiving this handover service is satisfied.

FIG. 6A illustrates an entire flow in the mobile communication system described above. FIG. 6B illustrates a flow of a detailed preparation (S1). Respective steps in the flows will hereinafter be described.

In step S1, at first, the base station controller 14 executes the preparation beforehand (presetting).

In FIG. 6B, in step S2, the base station controller is given conditions for starting and stopping the interference control function and numbers (referred to as "reference numbers") corresponding to a starting condition thereof and a stopping condition thereof.

FIG. 7 depicts an example of setting the starting condition and the stopping condition of the interference control function. As illustrated in FIG. 7, the starting condition and a threshold value related thereto, the stopping condition and a threshold value related thereto and the number (reference number) to be adopted are set in association with a base station ID (which is an identifier for specifying the base station and the sector). Each of the starting condition and the stopping condition can contain, e.g., a threshold value related to a time zone and a threshold value related to average transmission power.

In the case of applying always the interference control function, there is no particular necessity for setting the conditions illustrated in FIG. 7.

In step S3, with respect to each sector of each of the base stations, a quality absolute value [dB] is set on a per-base-station basis as the handover target and on a per-reference-number basis. A relative value is employed for determining in step S20 (FIG. 6) whether the hard handover is performed or not.

FIG. 8 illustrates an example of setting the relative value. FIG. 8 illustrates an example of a table in which a handover target (HO target) base station ID and a quality relative value [dB] associated with each reference number are set in association with the base station ID (an identifier for (specifying) the base station and the sector).

The quality relative value illustrated in FIG. 8 represents a difficulty level of the handover on the basis of zero (0). As the relative value takes a larger value, the handover to the handover target is more facilitated. As the relative value takes a smaller value, the handover to the handover target gets more difficult. Thus, the relative values function as weights for determining a plurality of handover target candidates as handover targets (handover destinations).

Further, when the relative value takes a value of 0 [dB], a result is the same as the case of not employing the interference control function. The mobile station may be handed over to the desired HO target by manipulating the value of the relative value ("relative value" field).

Referring back to FIG. 6B, in step S4, priority orders are assigned to the reference numbers given in step S2. FIG. 9 illustrates an example of setting the priority orders. As illustrated in FIG. 9, the reference number is allocated to a value representing a priority level. Namely, the value of the priority level is associated with the reference number.

In step S5, a threshold value is given in the "absolute value" field on a per-QoS (Quality of Service) basis with respect to the quality of the handover target (handover target base station). FIG. 10 illustrates an example of setting the absolute value of the quality (QoS). FIG. 10 also depicts a table in which to set the absolute values (calculated values of the qualities after executing the handover) each associated with the QoS (corresponding to a service type).

The information given in FIGS. 7 through 10 is set in, e.g., a control device (a computer) provided in the base station controller. The control device is constructed of a processor such as a CPU (Central Processing Unit), a main storage device such as a RAM (Random Access Memory), a secondary storage device such as a hard disk, an input/output (I/O) device, etc., and the information described above is stored in, e.g., the secondary storage device. The stored information is distributed to the respective base stations subordinate to the base station controller. Each base station refers to the distributed information on the occasion of performing the hard handover and determining the handover target (base station).

When terminating the processes in steps S2-S5, the preparation in step S1 is finished, and the processing advances to step S6 in FIG. 6A.

The processes from step S6 onward are, for example, executed by the respective base stations. Another available scheme may be taken, in which the base station controller accepts a report from each subordinate base station and executes, based on a content of the report, the processes from step S6 onward with respect to each base station.

Step S6 involves referring to the information (Table) as illustrated in FIG. 7 and determining whether at least one of the plurality of starting conditions for implementing the interference control function is satisfied or not.

In step S7, if at least one of the starting conditions is satisfied in step S6, the implementation of the interference control function (hard handover execution control) is started.

In step S8, each of the base stations under the base station controller, which implements the interference control function, gives a start instruction to periodically report the quality (periodic report) to the mobile stations subordinate to this base station. With this instruction, the mobile stations transmit the periodic reports on a predetermined cycle to the base station. An arbitrary value (e.g., 4 sec) is set as the cycle of the periodic report. Even when no such instruction is given, however, if the mobile station is given the setting of transmitting the periodic report to the base station, step S8 is not required.

Step S9 involves referring to the information (Table) as illustrated in FIG. 7 and determining whether all of the stopping conditions for implementing the interference control function are satisfied or not.

In step S10, in the case of determining that all of the stopping conditions are not satisfied, it is checked whether the quality report is transmitted from the mobile station or not.

In step S11, in the case of determining in step S10 that the periodic report arrives from the mobile station, a handover process for this mobile station is started.

In step S12, if it is determined in step S9 that all of the stopping conditions are satisfied, the interference control function is stopped.

In step S13, each base station transmits a periodic report stop instruction to the subordinate mobile stations. If the periodic report is related to neither the start nor the stop of the interference control function, step S13 is not required.

Figure 11:
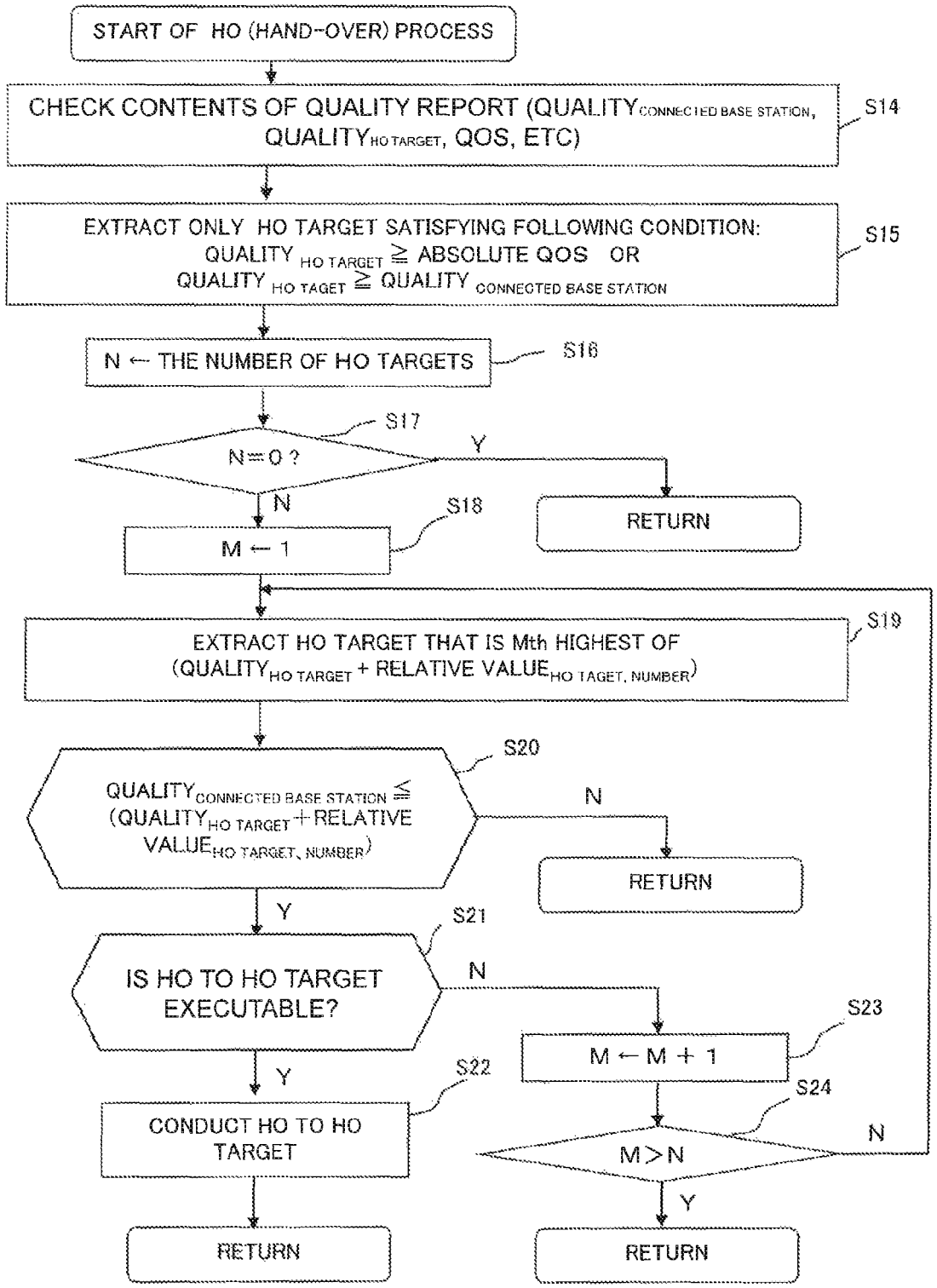
FIG. 11 illustrates an example of a flow of the interference control method (HO process) according to the embodiment.

FIG. 11 is a flowchart illustrating details of the handover (HO) process in step S11 depicted in FIG. 6A.

In step S14, the base station checks the contents ($Quality_{CONNECTED\ BASE\ STATION}$, $Quality_{HO\ TARGET}$, QOS, etc) of the periodic report sent from the mobile station.

Step S15 involves referring to the information (Tables) illustrated in FIGS. 8 and 10 and extracting, from the plurality of handover targets, the handover target of which the handover target (HO target) quality (QoS) exceeds the threshold value (the absolute value of the QoS) given in step S5 and the handover target of which the handover target (HO target) quality (QoS) is superior to the quality (QoS) of the connected base station (the base station of the HO source) as the candidates of the handover targets.

Namely, the handover targets satisfying the following determination formula are extracted.

Determination Formula:

$$Quality_{HO\ TARGET} \geq \text{Absolute Value QoS, or}$$

$$Quality_{CONNECTED\ BASE\ STATION} \leq Quality_{HO\ TARGET}$$

In step S16, the number of the handover targets is set to "N".

In step S17, it is checked whether the handover target (HO target) exists or not.

In step S18, an argument "M" is set to "1".

Step S19 involves referring to the information (Tables) illustrated in FIGS. 8 and 9 and extracting the handover target in which a value (in the case of a logarithm) obtained by totalizing the quality ($Quality_{HO\ TARGET}$) of the handover target and the relative value having the highest priority level that satisfies the starting condition in the relative values of the handover targets, becomes the Mth highest value (corresponding to a value of M at the present).

Step S20 involves referring to the information (Table) illustrated in FIG. 8 and carrying out the handover to the handover target (base station) extracted in step S19 if a value (in the case of a logarithm) obtained by totalizing the quality of the handover target which corresponds to the present value of M and the relative value having the highest relative value that satisfies the starting condition in the relative values of the handover targets, meets the quality (QoS) of the connected base station.

Namely, if the following determination formula <1> is satisfied, the handover is executed.

$$Quality_{CONNECTED\ BASE\ STATION} \leq (Quality_{HO\ TARGET} + Relative\ Value_{HO\ TARGET,\ NUMBER\ HAVING\ HIGHER\ PRIORITY\ LEVEL}) \quad \text{Determination Formula <1>}$$

In step S21, if step S20 is fulfilled, it is checked (determined) whether the handover to the handover target can be conducted or not. This process changes depending on a state of starvation of wireless resources of the handover target and is executed irrespective of the interference control in the embodiment.

In step S22, if step S21 is fulfilled, the handover to the handover target (HO target: target base station) is carried out. Note that when the mobile station moves to the area (sector) of the base station under another base station controller, the process based on the instruction of this base station controller is executed.

Step S23 is a process executed in the case of determining in step S21 that the handover may not be carried out, in which "1" is added to the present value of M.

In step S24, it is determined whether or not the argument value M becomes larger than the number of handover target as a whole N (Determination Formula: M>N).

<Configuration of Base Station>

Figure 12:
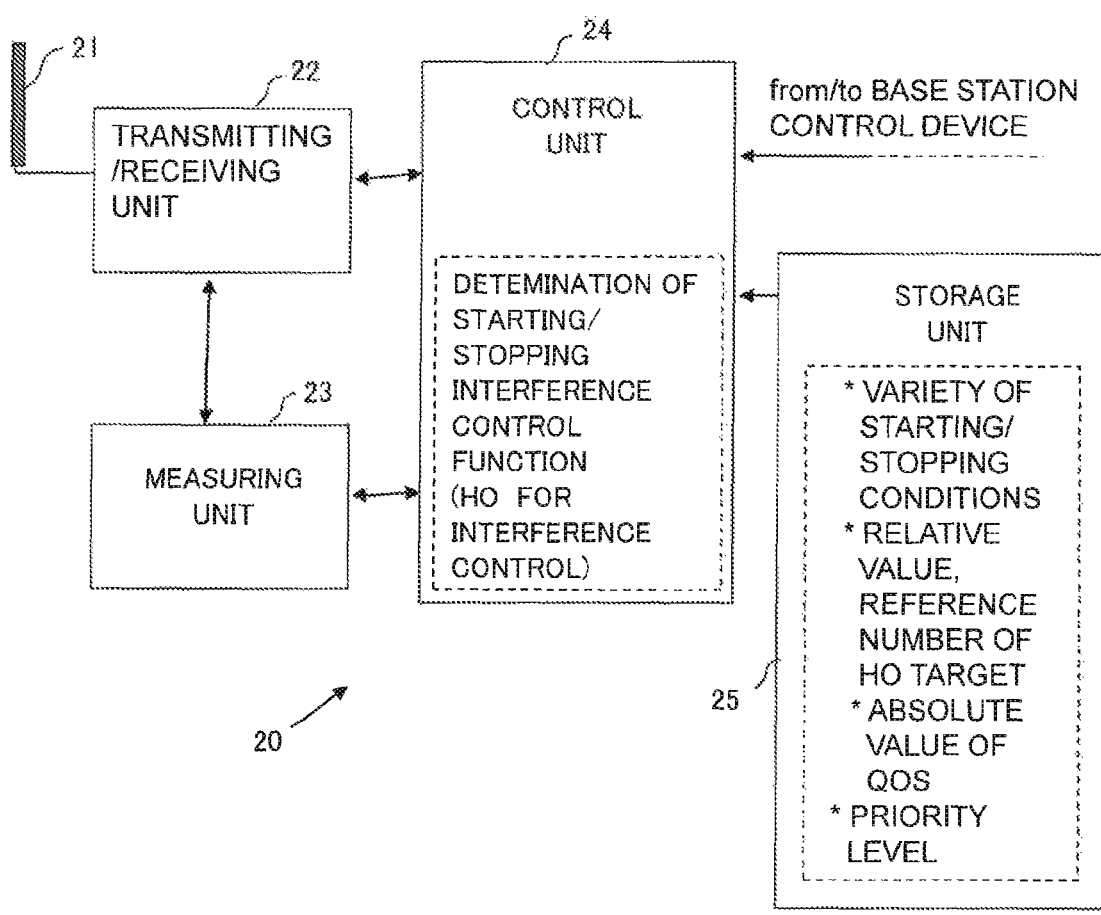
FIG. 12 illustrates an example of a configuration of a base station in the embodiment.

FIG. 12 illustrates an example of a configuration of the base station (base station device) related to the handover process. In FIG. 12, a base station 20 includes a transmitting/receiving antenna 21, a transmitting/receiving unit 22 which executes a process of transmitting and receiving a radio signal and a process of modulating and demodulating the signal, a measuring unit 23 which measures average transmission power and manages a usage state of the wireless resources, a control unit 24 and a storage unit 25.

The storage unit 25 is previously stored with items of information representing a variety of conditions for starting/stopping the interference control (FIG. 7), the table containing the relative value $HO_{TARGET,\ NUMBER}$ (FIG. 8), the absolute value of the QoS (FIG. 10) and the priority levels (FIG. 9). With respect to these items of information, the control unit receives the information generated on the base station controller through the processes illustrated in FIG. 6B from the base station controller and stores these items of information in the storage unit 25. Further, the storage unit 25 is stored with a program executed by the control unit 24 in order to carry out the processes as illustrated in FIGS. 6A and 11.

The control unit 24 is constructed of the processor such as the CPU, the main storage device such as the RAM and the input/output (I/O) device, etc., and executes the program stored in the storage unit 25, thereby implementing the interference control including the handover control.

Namely, the control unit 24 has the conditional formulae for starting and stopping the interference control function and the conditional formulae for carrying out the hard handover as well as determining whether the handover may be performed or not (checking the wireless resources of the handover target, etc), and executes the processes as illustrated in FIGS. 6A and 11.

Herein, the forcible hard handover is determined not in terms of the usage rate etc of the (physical) wireless resources in the base station 20 but in such a direction as to restrain the (area) interference. This is a crucial point of the interference control in the embodiment. Therefore, this hard handover is greatly different in purpose from the handover aiming at reducing a congestion of the wireless resources between the base stations and ensuring a minimum bandwidth for a user.

The interference control function in the embodiment may exhibit a larger interference restraining effect as there are larger deviations in the traffic distribution, the subscriber distribution and the important area distribution on the mobile communication network.

Note that the configuration of the base station depicted in FIG. 12 represents a configuration for performing the handover with respect to one sector (cell), and, if one single base station device includes a plurality of sector antennas, for example, the configuration illustrated in FIG. 12 is prepared on a per-sector basis. The control unit 24 and the storage unit can be, however, shared among the sectors.

First Specific Example

Figure 13A:
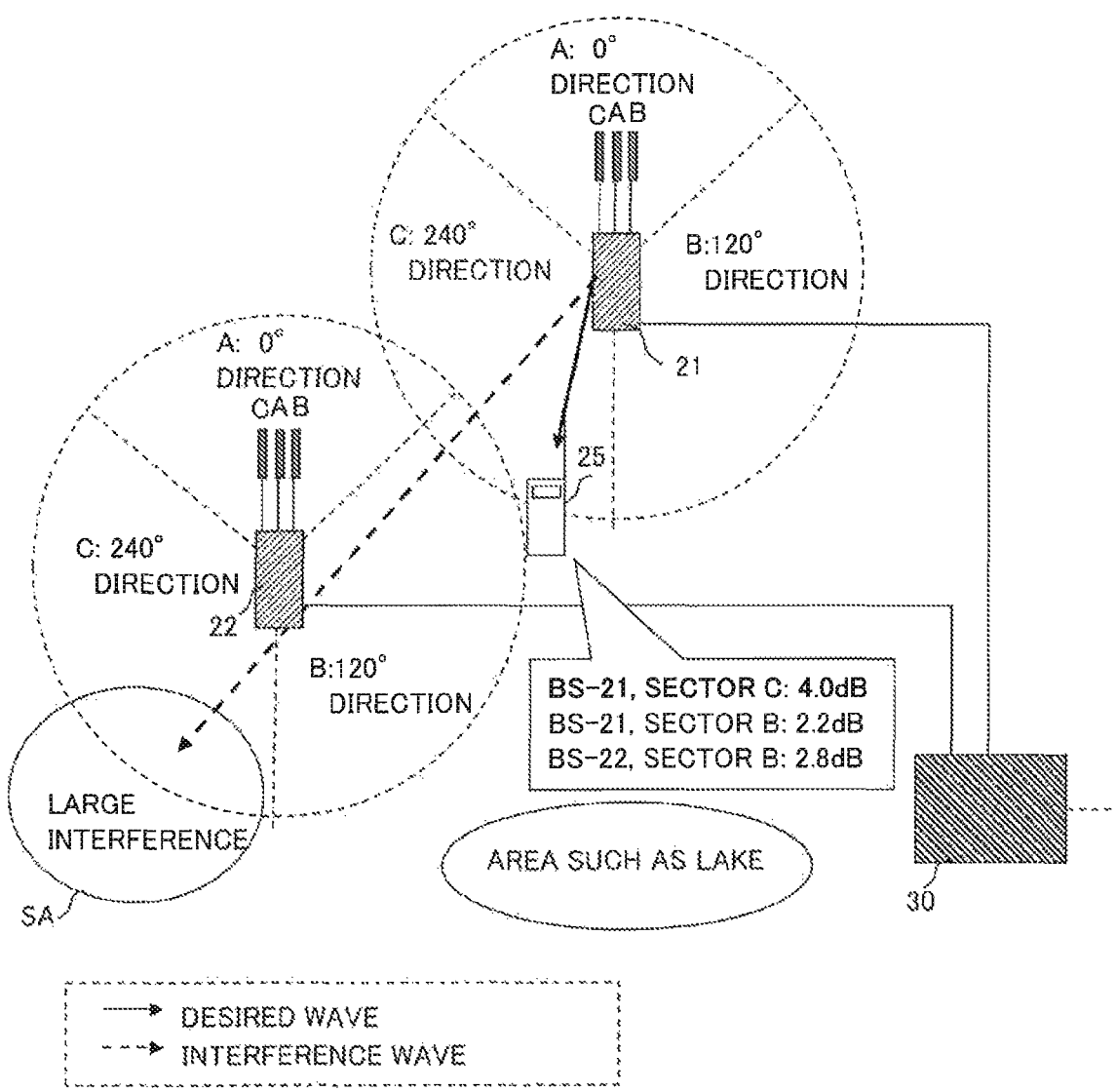
FIG. 13A illustrates a first specific example (pre-handover) of the embodiment.

A specific example of the interference control explained above will hereinafter be described. FIG. 13A illustrates the mobile communication system to which a first specific example is applied. In FIG. 13A, the mobile communication system (mobile communication network) includes abase station (RNC) controller 30 and base stations (BS) 21 and (BS) 22 subordinate to the base station controller 30.

The base station 21 has sector antennas A, B, C and includes (covers) three communication areas (sectors A, B, C) corresponding to these sector antennas A, B, C. FIG. 13A schematically illustrates the sectors A, B, C formed by segmenting an ellipse with the base station 21 being centered into three sector forms with the base station 21 being centered.

The base station 22 has, similarly to the base station 21, the sector antennas A, B, C and includes (covers) the three communication areas (sectors A, B, C) corresponding to these sector antennas A, B, C. FIG. 13A also schematically illustrates the sectors A, B, C formed by segmenting the ellipse with the base station 22 being centered into the three sector forms with the base station 22 being centered.

The communication areas (sectors) of the base station 21 are adjacent to the communication areas (sectors) of the base station 22, in which these communication areas are partly overlapped with each other. To be specific, the sector C of the base station 21 is overlapped with the sectors A, B of the base station 22. Further, the sector direction of the sector C of the base station 21 is in a state of facing wider a focused area SA (the sector C of the base station 22) than in the sector direction of the sector B of the base station 22.

A reachable range (coverage) (a wireless area) of the radio waves transmitted from each sector antenna extends, however, without being limited to the corresponding communication area (sector), to the neighboring communication area (sector) and to a farther area in some cases, depending on the sector direction. Thus, the radio waves reaching the area beyond the specified communication area (sector) might behave as the interference waves in the communication area different from the specified communication area. For example, the radio waves transmitted from the sector antenna C of the base station 21 might pass through the sector B of the base station 22 and might reach, as the interference waves, a partial area of the sector C of the base station 22.

The first specific example of the interference control function will be explained based on the following premises.
(1) A mobile station 25 is connected to the sector C.
(2) Herein, when focusing the sector C of the 22, the strong interference waves transmitted from the sector antenna C of the base station 21 reach the sector C (focused area SA) of this base station 22.
(3) In the mobile communication system (network system) illustrated in FIG. 13A, the interference control function is set so as to be implemented at all times.
(4) What is assumed as the communication system applied to the mobile communication system illustrated in FIG. 13A is a WiMAX (Worldwide Interoperability for Microwave Access) system which adopts OFDMA (Orthogonal Frequency Division Multiple Access).
(5) A frequency a is allocated to the sectors A of the base stations 21 and 22, a frequency b is allocated to the sectors B of the base stations 21 and 22, and a frequency c is allocated to the sectors C of the base stations 21 and 22.

<<Setting of Relative Value>>

The base station 31 is previously stored, as illustrated in FIGS. 14A, 14B and 14C, with tables in which to set the relative values (default threshold values) of one or more handover targets (HO targets) corresponding to the sectors A, B and C. Further, the base station 32 is previously stored, as illustrated in FIGS. 15A, 15B, 15C, with tables (referred to as relative value tables) in which to set the relative values (default threshold values) of one or more handover targets (HO targets) corresponding to the sectors A, B and C. Each relative value table is stored as a part of the handover table that is referred to when performing the handover control in the storage unit illustrated in FIG. 12.

The relative value is set larger, based on "0", as the degree of importance of the area (sector) gets lower but is set smaller as the degree of importance of the area becomes higher. With this contrivance, the area having the larger relative value can be determined preferentially as the handover target.

In FIGS. 14 and 15, an inverted value is allocated to the handover target to be paired in order to avoid iteration of the handover. For example, in the relative value table of the sector C of the base station 31 illustrated in FIG. 14C, the sector B of the base station 32 is set as the handover target, and 1.5 [dB] is set as the relative value. By contrast, in the relative value table of the sector B of the base station 31 illustrated in FIG. 15B, the sector C of the base station 31 is set as the handover target. At this time, the sector C of the base station 31 is paired with the sector B of the base station 32. Therefore, as illustrated in FIG. 15B, −1.5 [dB] is set as the relative value for the sector C of the base station 31.

In this case, it is understood that it is easy to perform the handover to the sector B of the base station 32 from the sector C of the base station 32, while the handover to the sector C of the base station 31 from the sector B of the base station 32 is not easy.

Moreover, when implementing the interference control function, 0 [dB] is set as the relative value for the sector which is not desired to be the handover target of the hard handover (which is not set as the operating target sector of the hard handover.

<<Setting of Absolute Value>>

The storage unit of each of the base stations 31 and 32 previously has, on a per-QoS (per-service-type) basis, a setting of the quality absolute value for determining whether the interference control function is implemented or not. FIG. 16 illustrates an example of the settings suited to the first specific example. In the example illustrated in FIG. 16, the desired wave to interference wave power ratio [dB] (Signal-to-Interference power Ratio: SIR) is applied as the quality standard. Further, an assumption for simplifying the description is that the uniform absolute value is applied to all the base stations (all the sectors of the base stations 31 and 32).

<<Handover Control (Interference Control)>>

The handover process in the base station 31 will hereinafter be described. The base station 31 executes the hard handover process. The base station 31 can have the same configuration (including, however, the three sector antennas) as the base station 20 illustrated in FIG. 12 has, and the control unit 24 as depicted in FIG. 12 takes the initiative in executing the handover process.

Under the implementation of the interference control function, the mobile station 35 sends the periodic report to the base station (base station 31). The base station 31 checks the contents of the periodic report. For example, it is presumed that the base station 31 receives the following (contents of) periodic report from the mobile station 35.

(a) The desired wave to interference wave power ratio (SIR) from the sector C of the base station 31 that is now kept in connection is on the order of 4.0 [dB].
(b) The SIR from the sector B (which will hereinafter be referred to as a candidate 1 as the case may be) of the base station 31 that can become the HO target is 2.2 [dB], and the SIR from the sector B (which will hereinafter be referred to as a candidate 2 as the case may be) of the base station 32 that can become the HO target is 2.8 [dB].
(c) The present QoS class is QoS-1 (best effort: see QoS-1 in FIG. 16).

The control unit 24 of the base station 31 refers to, e.g., the relative value table (FIG. 14C) stored in the storage unit 25 (FIG. 12), and checks the relative values associated with the sector B (candidate 1) of the base station 31 and the sector B (candidate 2) of the base station 32. At this time, the control unit 24 can, as illustrated in FIG. 14C, recognize that the relative value associated with the sector B (candidate 1) of the base station 31 is 2.0 [dB], and the relative value associated with the sector B (candidate 2) of the base station 32 is 1.5 [dB].

Next, the control unit 24 of the base station 31 checks by use of the following determination formula whether or not a sum of the quality of the handover target and the relative value associated with the handover target exceeds the quality of the connected base station.

Determination Formula (Logarithm)

$$\text{Quality}_{CONNECTED\ BASE\ STATION} \leq (\text{Quality}_{HO\ TARGET} + \text{Relative Value}_{HO\ TARGET})$$

Specific numerals are applied as follows.

Sector C of Base Station 31_4.0 [dB] Sector B (Candidate 1) of Base Station 31_2.2 [dB]+Relative Value 2.0 [dB]=4.2 [dB]

Sector C of Base Station 31_4.0 [dB] Sector B (Candidate 2) of Base Station 32_2.8 [dB]+Relative Value 1.5 [dB]=4.3 [dB]

As a result, it is understood that the values of both of the candidates 1 and 2 exceed the SIR value of the connected base station (the sector C of the base station 31). Hence, the control unit 24 of the base station 31 can determine one of the candidates 1 and 2 as the HO target for the mobile station 35. If a value of (Quality$_{HO\ TARGET}$+Relative Value$_{HO\ TARGET}$) of a certain candidate is equal to or smaller than the value of Quality$_{CONNECTED\ BASE\ STATION}$, this candidate is not selected as the HO target.

Herein, the control unit 24 of the base station 31 determines to execute the forcible hard handover to the candidate 2 (the sector B of the base station 32) having the highest value of (Quality$_{HO\ TARGET}$+Relative Value$_{HO\ TARGET}$) and makes preparations for this handover.

Before making the HO preparations, the control unit 24 determines whether or not the SIR value of the candidate (which is herein the candidate 2) determined to undergo the execution of the handover (HO) is larger than the quality absolute value (the absolute value of the QoS) after the execution of the HO. Specifically, the control unit 24 refers to the absolute value table as illustrated in FIG. 16, and thus determines whether or not the SIR value of the candidate 2 is larger than the QoS absolute value (which is herein 1.0 [dB]) associated with the present QoS class (QoS-1) of the mobile station 35. Herein, the SIR value of the candidate 2 is larger than the absolute value of QoS-1, and hence the HO preparations are carried out.

If the QoS class of the mobile station 35 is QoS-3 (3.5 [dB]: FIG. 16), since the quality value (SIR) "2.8 [dB]" of the candidate 2 is equal to or smaller than the absolute value (3.5 [dB]) of QoS-3, the HO preparations are stopped, and the hard handover (HO) of the mobile station 35 is not executed. If the quality of the candidate 2 is superior to the quality of the connected base station, however, the hard handover (HO) may be carried out.

In the HO preparations, the base station 31 instructs the mobile station 35 to transmit a hard handover request to the sector B of the base station 32 serving as the HO target. The base station 31, upon receiving the hard handover request from the mobile station 35, executes the HO process to the HO target.

In the HO process, the HO target (the sector B of the base station 32) might reject the HO (Ho request) of the mobile station 35 for the reason such as the starvation of the wireless resources in the HO target. In this case, the mobile station 35 notifies the base station 31 defined as the HO source that the HO is rejected.

At this time, the control unit 24 of the base station 31 can instruct the mobile station 35 to conduct the handover (HO) to the candidate 1 (the sector B of the base station 31). The mobile station 35 can, based on this instruction, execute the HO process to the candidate 1.

If the HO to the candidate 2 is accepted, through the handover process, the connection target of the mobile station 35 is switched over to the sector B of the base station 32 from the sector C of the base station 31.

Figure 13B:
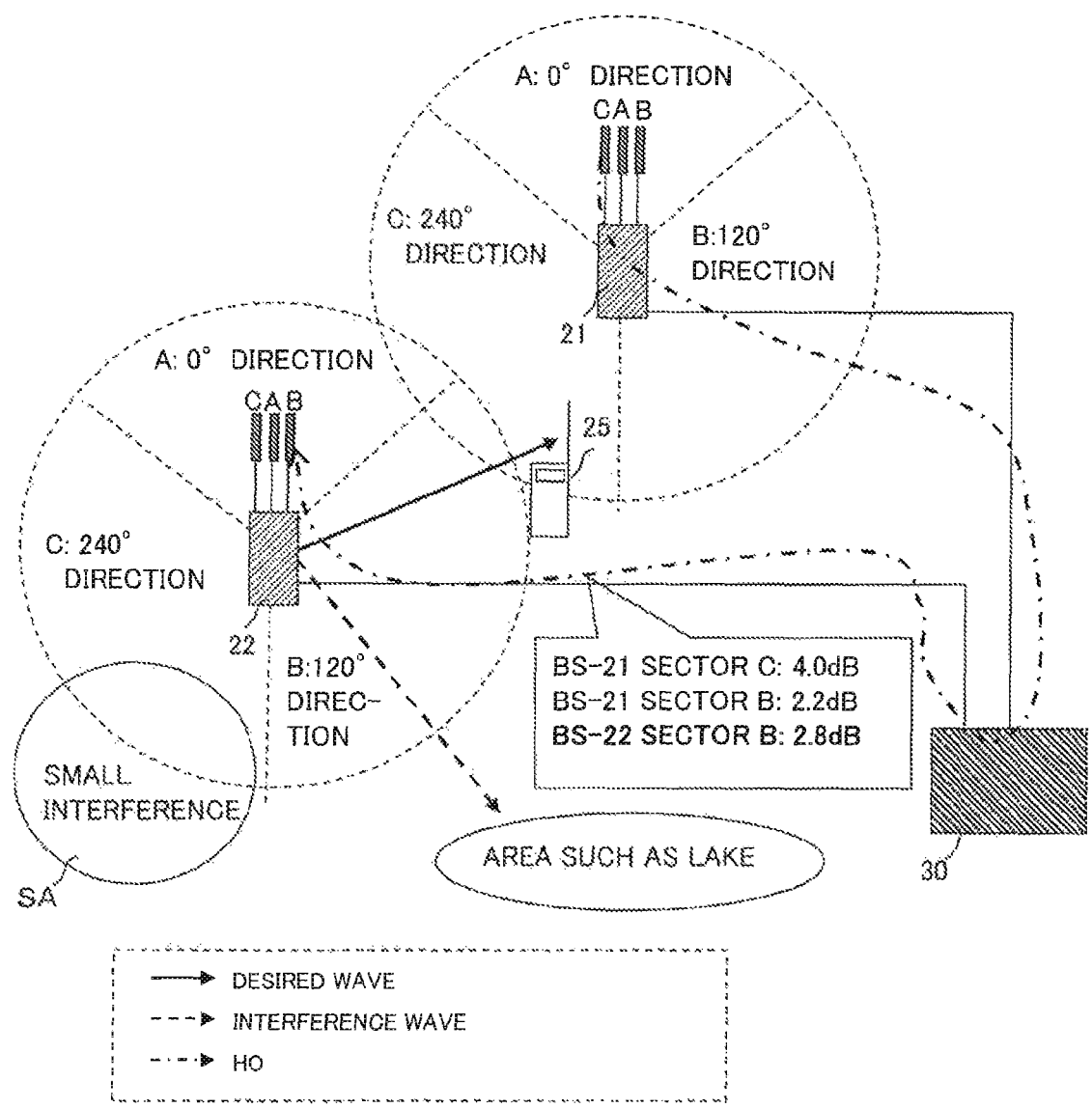
FIG. 13B illustrates the first specific example (post-handover) of the embodiment.

FIG. 13B illustrates a situation after the forcible hard handover has been done. As illustrated in FIG. 13B, with the hard handover of the mobile station 35, the radio waves are not transmitted to the mobile station 35 from the sector antenna C of the base station 31. Therefore, the radio waves (interference waves) directed to the mobile station 35 from the sector antenna C of the base station 31 do not reach the sector C (the focused area SA (specified area)) of the base station 32. Hence, the interference quantity with the sector C (the focused area SA) of the base station 32 from the sector C of the base station 31 is reduced. This reduction in the interference quantity leads to an improvement of the communication environment in the focused area SA.

Note that a large proportion of radio waves transmitted from the sector antenna B of the base station 32 are propagated to the area such as a lake having a low degree of importance. With this contrivance, the forcible hard handover can restrain, to the greatest possible degree, the influence exerted on other areas (sectors) by the radio waves transmitted from the sector of the HO target.

Second Specific Example

Figure 17A:
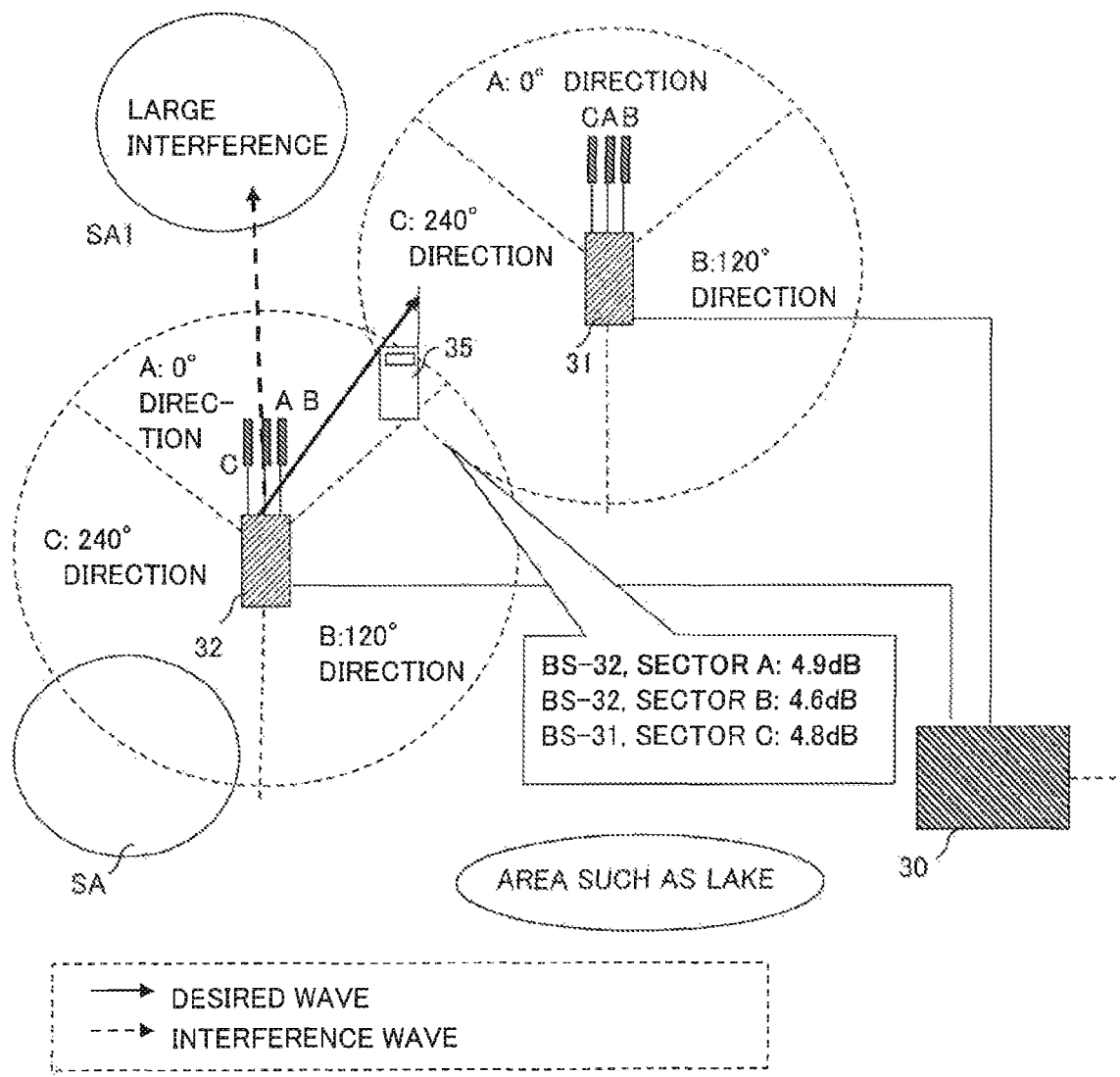
FIG. 17A illustrates a second specific example (pre-handover) of the embodiment.

Next, a second specific example of the interference control will hereinafter be described. In the second specific example, the same configuration as in the first specific example is explained in a simplified mode. FIG. 17A illustrates the mobile communication system to which the second specific example is applied. The configuration of the mobile communication system in FIG. 17A is substantially the same as in the first specific example (FIG. 13A), and hence its description is omitted.

The second specific example is different from the first specific example mainly in terms of the following points.
(a) The conditions for starting and stopping the interference control function are specified.
(b) A plurality of focused areas SA and SA1 is taken into consideration, and interference control priority orders of the focused areas SA and SA1 are specified. Herein, the sector direction of the sector A of the base station 32 is in a state of facing wider the focused area SA1 than in the sector direction of the sector C of the base station 31.

Therefore, the details of the handover process in the base station are different from those in the first specific example.

The second specific example of the interference control function will hereinafter be described based on the following premises.

(1) The mobile station 35 connects with the sector A of the base station 32.
(2) The focused area SA1 exists on an extension line of the sector A of the base station 32.
(3) The mobile communication system (network system) illustrated in FIG. 17A implements the interference control function when the specified conditions are satisfied.
(4) What is assumed as the communication system applied to the mobile communication system illustrated in FIG. 17A is the WiMAX (Worldwide Interoperability for Microwave Access) system which adopts OFDMA (Orthogonal Frequency Division Multiple Access).
(5) The frequency a is allocated to the sectors A of the base stations 31 and 32, the frequency b is allocated to the sectors B of the base stations 31 and 32, and the frequency c is allocated to the sectors C of the base stations 31 and 32.

<<Setting of Conditions>>

The storage unit 25 of each of the base stations 31 and 32 previously retains a table (condition table) stored with a combination (a record) of the starting condition and the stopping condition of the interference control function and the number (reference number) for specifying the interference control function.

FIG. 18 illustrates an example of the condition table. The starting condition of the interference control function is also a condition for suggesting an increase in interference quantity. The starting condition can involve applying one or a plurality of combinations of the following parameters.

(A) A time zone (in a proportional relation or in a high correlation) having a possibility of increasing the interference quantity directly or indirectly.
(B) Resource usage rate.
(C) Traffic quantity.
(D) An average value of qualities (e.g., SIRs) of a mobile station group, which is reported from the mobile station group.
(E) A median of the qualities (e.g., SIRs) of the mobile station group, which is reported from the mobile station group.
(F) A minimum value of the qualities (e.g., SIRs) of the mobile station group, which is reported from the mobile station group.
(G) A percentile of the qualities (e.g., SIRs) of the mobile station group, which is reported from the mobile station group.
(H) A lost-call rate.
(I) A call disconnection rate.
(J) Average transmission power.
(K) Average reception power.
(L) An average sector throughput.

In the example illustrated in FIG. 18, the time zone and a relative value of the average transmission power are set as trigger parameters, and, if at least one of the two values satisfies the threshold value becoming the starting condition, the interference control function is started.

Herein, the reference number 1 is generated based on the assumption of the focused area SA in FIG. 20, and the reference number 2 is generated based on the assumption of the focused area SA1. The focused area SA corresponds to the focused area SA explained in the first specific example (FIG. 13A). For example, it is assumed that the focused area SA is defined as an area (commercial area such as a shopping area) where the high traffic is observed in the daytime, while the focused area SA1 is an area (eating/drinking area) where the high traffic is observed in the nighttime.

Thus, the condition table stored with one or more entries of the information (called an interference control pattern) representing the starting and stopping conditions of the interference control on the assumption of the interference control with respect to the specified area (focused area), can be prepared in the storage devices of the base station and the base station controller. An interference control pattern is specified by using the reference number.

The storage unit 25 (FIG. 12) of the base station 32 previously retains the table (condition table) stored with one or more entries each containing the combination of identifying information of the focused area becoming a target of the interference control function, the starting and stopping conditions of the interference control function and the number (reference number) for specifying the interference control function such as this.

This structure may provide flexibility to the interference control with respect to the specified area in which the influence of the interference from another area increases or decreases depending on the time zone and with respect to the specified area in which the influence of the interference from another area temporarily augments depending on an event.

<<Setting of Priority Level>>

The storage unit 25 (FIG. 12) of each of the base stations 31 and 32 previously retains a priority level table in which to set priority levels associated with the entries (reference numbers) of the interference control patterns set in the condition table (FIG. 18).

FIG. 19 illustrates an example of the priority level table. As illustrated in FIG. 19, the priority level table is stored with the reference numbers of the respective entries in the way of being associated with the orders (priority orders) representing the priority levels. In the example depicted in FIG. 19, it is specified that the interference control pattern specified by the reference number 1 is carried out preferentially to the interference control pattern specified by the reference number 2.

<<Setting of Relative Value>>

The storage unit 25 (FIG. 12) of the base station 31 retains a relative value table as illustrated in FIGS. 20A, 20B and 20C. Further, the storage unit 25 of the base station 32 retains a relative value table as illustrated in FIGS. 21A, 21B and 21C.

Each relative value table is prepared on the per-sector basis of the base station. The relative value table is stored with IDs of the plurality of base station that may become the HO targets (handover targets) with respect to the sectors of the base stations and further stored with the relative values [dB] associated with the respective reference numbers (interference control patterns) with respect to the base station IDs. The method of determining the relative value is the same as in the first specific example.

<<Setting of Absolute Value>>

The storage unit of each of the base stations 31 and 32 previously has, on the per-QoS (per-service-type) basis, the setting of the quality absolute value for determining whether the interference control function is implemented or not. FIG. 22 illustrates an example of the settings suited to the second specific example. In the example illustrated in FIG. 22, the SIR [dB] is set as the standard of the quality. Further, the assumption for simplifying the description is that the uniform absolute value is applied to all the base stations (all the sectors of the base stations 31 and 32).

<<Handover Control>>

In the mobile communication system illustrated in FIG. 17A, the mobile station 35 connects with the sector A of the base station 32. A presumption herein is that the average transmission power measured by the measuring unit 23 (FIG. 12) reaches, e.g., 90% in the sector A of the base station 32 and the control unit 24 recognizes (determines) that the starting condition (the average transmission power is equal to or larger than 80%) associated with the reference number 2, which is specified in the condition table (FIG. 18), is satisfied. At this point of time, however, it is presumed that the average transmission power in the sector C of the base station 31 does not satisfy the starting condition (the average transmission power is smaller than 80%) associated with the reference number 1.

Then, the control unit 24 of the base station 32 comes to a status of giving the periodic report transmitting instruction to the subordinate mobile stations 35 and receiving the periodic reports from the mobile stations 35 at regular intervals. An assumption herein is that the base station 32 receives the following periodic reports from the mobile stations 35.

(a) The SIR (Quality$_{CONNECTED\ BASE\ STATION}$) from the sector A of the base station 32 that is now kept in connection is on the order of 4.9 [dB].
(b) The SIR from the sector C (candidate 2) of the base station 31 that can become the handover target (HO target) is 4.6 [dB], and the SIR from the sector C (candidate 2) of the base station 31 that may become the HO target is 4.8 [dB].
(c) The present QoS class is QoS-1 (corresponding to FIG. 22).

The control unit 24 of the base station 32 refers to the relative value table (FIG. 21A) and thus checks the relative values of the candidates 1 and 2 associated with the reference number 2. In the reference number 2 in FIG. 21A, it is understood that the relative value associated with the sector B of the base station 32 is 1.0 [dB], and the relative value associated with the sector C of the base station 31 is 0.5 [dB].

Note that the starting condition in the reference number 1 is not satisfied, and hence the process related to the reference number 1 is not executed. If both of the starting condition in the reference number 1 and the starting condition in the reference number 2 are satisfied, however, the priority level table illustrated in FIG. 19 is referred to, and the process with respect to the reference number having the higher priority order is executed according to the priority orders set in the priority level table. Namely, the process with respect to not the reference number 2 but the reference number 1 is executed.

Next, the base station 31 checks by use of the following determination formula whether or not a sum of the quality of the handover target (candidate) and the relative value allocated to the handover target (candidate) exceeds the quality of the connected base station.

Determination Formula (Logarithm)

$$\text{Quality}_{CONNECTED\ BASE\ STATION} \leq (\text{Quality}_{HO\ TARGET} + \text{Relative Value}_{HO\ TARGET,\ NUMBER\ HAVING\ HIGH\ PRIORITY\ LEVEL})$$

The following are results of applying the determination formula to the candidate 1 and the candidate 2.

Sector A of Base Station 32_4.9 [dB] Sector B (Candidate 1) of Base Station 32_4.6 [dB]+Relative Value 1.0 [dB]=5.6 [dB]

Sector A of Base Station 32_4.9 [dB] Sector C (Candidate 2) of Base Station 31_4.8 [dB]+0.5 [dB]=5.2 [dB]

As described above, the sum with respect to each of the candidate 1 and the candidate 2 is larger than the quality value of the connected base station, and hence both of the candidate 1 and the candidate 2 have eligibility for the HO targets. The final HO target is the single base station and is therefore selected from the candidate 1 and the candidate 2.

Herein, the sum (5.6 [dB]) of the quality value and the relative value with respect to the candidate 1 is larger than the sum (5.2 [dB]) of the quality value and the relative value with respect to the candidate 2, and therefore the base station 32 selects the candidate 1 as the final HO target and makes the preparations for the hard handover to the HO target.

Figure 17B:
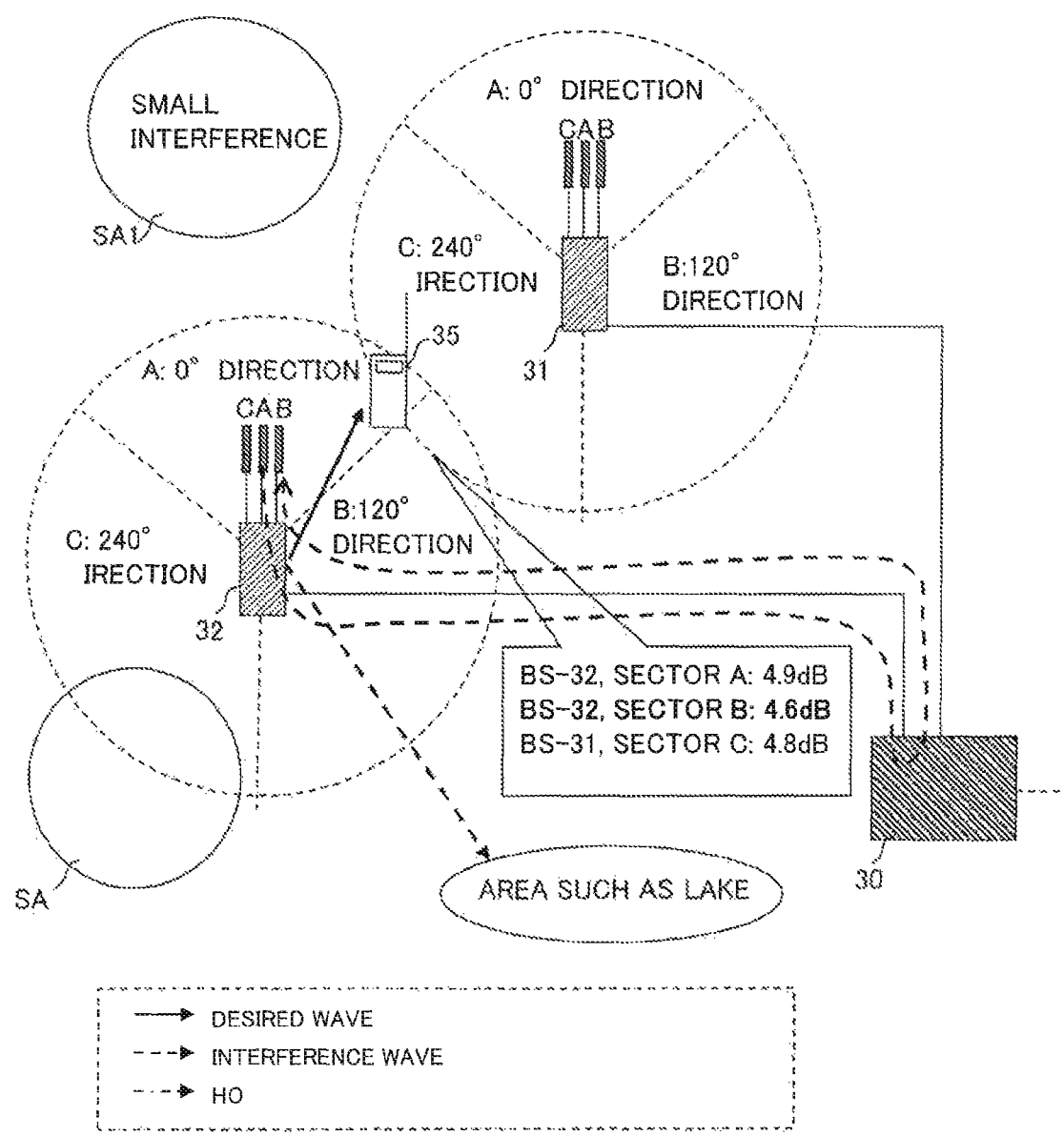
FIG. 17B illustrates the second specific example (post-handover) of the embodiment.

Thereafter, in the same procedures as the procedures explained in the first specific example, the connection target of the mobile station 35 undergoes the hard handover to the sector B of the base station 32 from the sector A of the base station 32. FIG. 17B illustrates how this hard handover is performed. This hard handover leads to a decrease in interference waves reaching the focused area SA1 and a decrease in interference quantity with the focused area.

Note that the mobile station 35 in the second specific example is located in an overlapped range of the sector C of the base station 31 with the sector A of the base station 32 and performs the wireless communications with one of the base stations 31 and 32 by establishing the connection therewith, in which case the following method may be applied.

For example, if required to reduce the interference quantity from the sector A of the base station 32 with the focused area SA1, pieces of broadcast information (broadcast signals) transmitted from the respective base stations 31 and 32 contain a control signal for giving an instruction to connect with not the base station 32 but the base station 31 as the initial connection target.

In other words, even under such a state that the mobile station 35 should connect with not the base station 31 but the base station 32 for better wireless communications, the control is conducted so that the mobile station 35 is connected to the base station 31. Under this control, when the base station 32 radiates the radio waves toward the mobile station 35, the radio waves may be prevented from interfering with the focused area SA1.

<<Operational Effect in Embodiment>>

According to the embodiment, the mobile communication system which uses the sector antennas and performs the hard handover, is provided with the interference control function of forcibly carrying out the hard handover of the mobile station (Mobile Station) kept in connection with a certain sector of a certain base station to another base station or another sector of the same base station in a way that takes account of the interference exerting direction in the base station (Base Station) or the base station controller (Base Station Controller). With this scheme, the interference quantity of the downlink in the specified direction is reduced to the greatest possible degree, and, instead, the interference quantity of the downlink in another direction is forced to be sacrificed, thereby enabling the interference quantity of the whole area to be properly dispersed and enabling the wireless line quality for the whole subscribers or the limited focused area to be improved.

Moreover, in the embodiment, each base station may hold, on the per-HO-target basis in all the handover targets, the single or plural relative values of the quality enabling the hard handover to be permitted.

Further, in the embodiment, the mobile station has the function of performing the hard handover if the value obtained by adding (or multiplying) the sector quality of the base station serving as the handover target to the relative value allocated to the sector of the base station becoming the handover target exceeds the sector quality of the base station kept in connection as the condition for forcibly conducting the hard handover.

Still further, the embodiment provides the function of not, in the course of executing the hard handover, when the quality of the post-handover mobile station becomes equal to or lower than a certain specified absolute value, performing the handover of this mobile station. This function is not, however, applied to a case where the quality of the post-handover mobile station is better than the quality of the connection target. The absolute value may be allocated on the per-QoS basis (per-service-type basis such as the best effort).

Yet further, according to the embodiment, in the sectors of the single or plural base stations, if the specified condition (starting condition) for suggesting the increase in interference quantity is not satisfied, the interference control is not carried out.

Furthermore, according to the embodiment, in the sectors of the single or plural base stations, whereas if the specified condition (starting condition) for suggesting the increase in interference quantity is satisfied, the relative value associated with this condition is adopted as one of the values for selecting the HO target.

Moreover, in the embodiment, if the plural conditions are coincident simultaneously, the relative value having the pre-assigned high priority level and associated with the condition is adopted.

Further, in the embodiment, the time zone (in the proportional relation or in the high correlation) having the possibility of increasing the interference quantity directly or indirectly, or the traffic quantity, or the usage bandwidth rate, or the average value of qualities of the mobile station group, or the median of the qualities of the mobile station group, or the minimum value of the qualities of the mobile station group, or the percentile of the qualities of the mobile station group, or the lost-call rate, or the call disconnection rate, or the average transmission power, or the average reception power, or the average sector throughput is given together with the arbitrary threshold value associated therewith as the specified condition for suggesting the increase in interference quantity.

According to the embodiment, the interference control function (interference control method) described above is applied, whereby the interference may be properly dispersed and it is feasible to reduce the interference quantity exerted on a certain focused specified area such as an area taking account of the high traffic.

The interference control method described in the embodiment is capable of acquiring the preferable interference quantity reducing effect in the focused specified area by generating the optimal interference control pattern in a way that takes into consideration the variety of items such as the traffic distribution, the subscriber distribution, the interference distribution, the focused area distribution, the base station distribution, the sector direction, the value in the absolute value (absolute value field) and the accuracy of the frequency planning.

It is confirmed from the results of statistical simulations performed by the applicant of the present application that if the interference control method according to the embodiment is applied when having an idealistic model such as the traffic distribution being uniform, the statistical decrease rate of the interference with a certain focused area is approximately 16.0% when the relative value is set to 1.0 [dB] and is approximately 25.6% when the relative value is set to 2.0 [dB].

It is to be noted that the embodiment described above has discussed the mobile communication system in which each of the plurality of base stations includes the plurality of sectors, and the hard handover is conducted between the sectors. In place of this configuration, it is also possible to apply a mobile communication system in which each of the plurality of base stations has the single communication area (cell) and a mobile communication system in which the base stations each having the cell and the base stations each including the plurality of sectors exist in mixture.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control method, comprising:
controlling a mobile terminal located in an overlapped area between a first wireless area formed in a direction of a first sector among a plurality of sectors formed by a first base station and a second wireless area formed in a direction of a second sector among a plurality of sectors formed by a second base station so that the mobile terminal performs a handover from the first wireless area to the second wireless area or a connecting process to the second wireless area when an interference given to a specific area that is different from the first wireless area and the second wireless area by radio waves radiated in the direction of the first sector from the first base station is greater than an interference given to the specific area by radio waves radiated in the direction of the second sector from the second base station, wherein the handover is performed even if a communication quality in the first wireless area is better than a communication quality in the second wireless area.

2. A mobile communication system, comprising:
a first base station to form a plurality of sectors including a first sector;
a second base station to form a plurality of sectors including a second sector; and
a unit to control a mobile terminal located in an overlapped area between a first wireless area formed in a direction of the first sector and a second wireless area formed in a direction of the second sector so that the mobile terminal performs a handover from the first wireless area to the second wireless area or a connecting process to the second wireless area when an interference given to a specific area that is different from the first wireless area and the second wireless area by radio waves radiated in the direction of the first sector from the first base station is greater than an interference given to the specific area by radio waves radiated in the direction of the second sector from the second base station, wherein the handover is performed even if a communication quality in the first wireless area is better than a communication quality in the second wireless area.

3. A mobile communication system having a plurality of communication areas serving as connection targets of a mobile terminal, comprising:
a control unit to determine, when the mobile terminal is connected to a first base station forming a first sector included in the plurality of communication areas and radio waves transmitted from the first base station in a direction of the first sector and received by the mobile terminal become interference waves to a communication area, a second base station becoming a handover target transmitting radio waves in direction of a second sector included in the plurality of communication areas in which an interference quantity given to the communication area by the radio waves transmitted in direction of the second sector from the second base station is lower than an interference quantity given to the communication area by the radio waves transmitted in the direction of the first sector from the first base station, wherein the control unit determines the handover target from at least one handover target candidate associated with the communication area, wherein the communication area is different from the first sector and the second sector; and a unit to execute forcible handover of the mobile terminal to the determined handover target even if a communication quality in the first sector is better than a communication quality in the second sector.

4. The mobile communication system according to claim 3, wherein when there are a plurality of handover candidates associated a certain communication area and each of the handover candidates has a weight used for determining the handover target, the control unit determines the handover target from the plurality of handover target candidates based on the weight of each of the handover candidates, and the weight of each of the handover candidates is determined in consideration with an interference quantity to communication areas other than a communication area of a handover target candidate caused by radio waves transmitted from the handover target candidate to the mobile terminal.

5. The mobile communication system according to claim 4, wherein the control unit obtains a communication quality evaluation value of the mobile terminal when assuming that the mobile terminals handed over to the handover target candidate and the weight allocated to the handover target candidate, and determines, as the handover target, the handover target candidate with the quality evaluation value superior to the communication quality of the mobile terminal in the certain communication area.

6. The mobile communication system according to claim 3, wherein the control unit has an absolute value of the communication quality to be ensured for the mobile terminal, and excludes such a handover target candidate that the communication quality value of the post-handover mobile terminals smaller than the absolute value of the mobile terminal.

7. The mobile communication system according to claim 6, wherein the control unit has a plurality of absolute values determined for every service type used by the mobile terminal, and compares the absolute value associated with the service type that is currently used by the mobile terminal with the present communication quality value of the mobile terminal.

8. The mobile communication system according to claim 3, wherein the control unit has an executing condition for executing the forcible handover of the mobile terminal kept in connection with the communication area with respect to the communication area to which the radio waves becoming the interference waves with a specified communication area are transmitted, and, when the executing condition is satisfied, determines the handover target of the mobile terminal.

9. The mobile communication system according to claim 8, wherein priority orders are predetermined in association with at least two executing conditions, and when each of the two executing conditions is satisfied, the hard handover related to the executing condition having the higher priority order is conducted based on the priority orders.

10. The mobile communication system according to claim 8, wherein the executing condition is a condition for suggesting that the interference influence from another area in the specified communication area rises.

11. A base station to transmit radio waves toward a mobile terminal connected to a first sector formed by the base station in a mobile communication system having a plurality of communication areas serving as a connection target of the mobile terminal, the base station comprising:

a control unit to determine, when radio waves transmitted from the base station in a direction of the first sector included in the plurality of communication areas and received by the mobile terminal become interference waves to a communication area, another base station becoming a handover target transmitting radio waves in direction of a second sector included in the plurality of communication areas in which an interference quantity given to the communication area by the radio waves transmitted in direction of the second sector from the another base station is lower than an interference quantity given to the communication area by the radio waves transmitted in the direction of the first sector from the base station, wherein the control unit determines the handover target from at least one handover target candidate associated with the communication area, wherein the communication area is different from the first sector and the second sector; and a unit to execute forcible handover of the mobile terminal to the determined handover target even if a communication quality in the first sector is better than a communication quality in the second sector.

\* \* \* \* \*